United States Patent
Lo et al.

(10) Patent No.: US 11,638,259 B2
(45) Date of Patent: Apr. 25, 2023

(54) UPLINK AND DOWNLINK STREAMING BIT RATE ASSISTANCE IN 4G AND 5G NETWORKS

(71) Applicant: QUALCOMM Incorporated, San Diego, CA (US)

(72) Inventors: Charles Nung Lo, San Diego, CA (US); Imed Bouazizi, Frisco, TX (US); Nikolai Konrad Leung, San Francisco, CA (US); Thomas Stockhammer, Bergen (DE)

(73) Assignee: QUALCOMM INCORPORATED, San Diego, CA (US)

( * ) Notice: Subject to any disclaimer, the term of this patent is extended or adjusted under 35 U.S.C. 154(b) by 53 days.

(21) Appl. No.: 16/874,955

(22) Filed: May 15, 2020

(65) Prior Publication Data

US 2021/0120540 A1    Apr. 22, 2021

Related U.S. Application Data

(60) Provisional application No. 62/916,451, filed on Oct. 17, 2019.

(51) Int. Cl.
*H04L 1/00* (2006.01)
*H04W 72/04* (2023.01)
(Continued)

(52) U.S. Cl.
CPC ........... *H04W 72/048* (2013.01); *H04W 8/22* (2013.01); *H04W 68/005* (2013.01); *H04W 72/1236* (2013.01); *H04W 76/11* (2018.02)

(58) Field of Classification Search
CPC ........... H04W 72/048; H04W 72/1236; H04W 68/005; H04W 76/11; H04W 24/10;
(Continued)

(56) References Cited

U.S. PATENT DOCUMENTS

2006/0251234 A1    11/2006 Cooke
2012/0172031 A1*   7/2012 Marocchi ............ H04W 72/005
                                                    455/422.1
(Continued)

FOREIGN PATENT DOCUMENTS

BR    112020025846 A2 *  3/2021   ........ H04W 36/0011
EP         2103055 B1 * 11/2010   ........ H04L 12/5602
(Continued)

OTHER PUBLICATIONS

International Search Report and Written Opinion—PCT/US2020/051157—ISAEPO—dated Nov. 12, 2020.
(Continued)

*Primary Examiner* — David Q Nguyen
(74) *Attorney, Agent, or Firm* — The Marbury Law Group

(57) ABSTRACT

Various embodiments may provide streaming service downlink network assistance and/or uplink network assistance mechanisms in a fifth generation (5G) system (5GS) network via an Application Function (AF) computing device in a 5GS. In some embodiments, a computing device and/or the AF computing device may inform the network about needs for capacity for downlink or uplink traffic. Various embodiments may include sending radio access network (RAN) capacity requests to a network computing device of the 5GS network including a 5G RAN. In some embodiments, the network computing device of the 5GS network may be a computing device that is not part of the 5G RAN. In some embodiments, capacity need messages may be sent directly from user equipment (UE) computing devices to computing devices of the 5G RAN. In some embodiments, capacity information of the RAN may be delivered to an AF computing device via an intermediate network function.

37 Claims, 12 Drawing Sheets

(51) Int. Cl.
*H04W 8/22* (2009.01)
*H04W 76/11* (2018.01)
*H04W 72/12* (2023.01)
*H04W 68/00* (2009.01)

(58) Field of Classification Search
CPC ......... H04W 8/22; H04W 4/00; H04W 28/24; H04W 48/14; H04L 65/80
USPC .................. 370/328, 329, 330, 331, 233
See application file for complete search history.

(56) References Cited

U.S. PATENT DOCUMENTS

| | | | |
|---|---|---|---|
| 2015/0230184 A1* | 8/2015 | Raleigh ............. | H04M 15/8016 370/230 |
| 2016/0008924 A1 | 1/2016 | Canourgues et al. | |
| 2018/0295032 A1* | 10/2018 | Yu ....................... | H04L 41/5058 |
| 2019/0082361 A1 | 3/2019 | Nylander et al. | |
| 2019/0268815 A1* | 8/2019 | Zhu ..................... | H04W 36/023 |
| 2020/0404069 A1* | 12/2020 | Li ........................ | H04L 67/289 |

FOREIGN PATENT DOCUMENTS

| | | | | |
|---|---|---|---|---|
| WO | 2015124210 A1 | 8/2015 | | |
| WO | WO-2016171404 A1 * | 10/2016 | ......... | H04L 43/0894 |
| WO | WO-2017062014 A1 * | 4/2017 | ......... | H04L 41/5019 |

OTHER PUBLICATIONS

KPN N.V., et al., "Network Assistance and Caching Protocols for DASH", 3GPP Draft, 3GPP TSG SA4 Meeting #104, S4-190676, 3rd Generation Partnership Project (3GPP), Mobile Competence Centre, 650, Route Des Lucioles, F-06921 Sophia-Antipolis Cedex, France, vol. SA WG4, No. Cork, Ireland, Jun. 1, 2019-Jun. 5, 2019, Jun. 28, 2019 (Jun. 28, 2019), XP051754958, 5 Pages, Retrieved from the Internet: URL: http://www.3gpp.org/ftp/Meetings_3GPP_SYNC/SA4/Docs/S4-190676.zip [retrieved on Jun. 28, 2019], the whole document.

"3rd Generation Partnership Project; Technical Specification Group Services and System Aspects; 5G Media Streaming (5GMS); General description and architecture (Release 16)", 3GPP Draft, 3GPP TS 26.501 V16.1.0 (Aug. 2019), 26501-G00-Updates-For-SA4-106, 3rd Generation Partnership Project (3GPP), Mobile Competence Centre, 650, Route Des Lucioles, F-06921 Sophia-Antipolis Cedex, France, Oct. 15, 2019 (Oct. 15, 2019), XP051799418, pp. 1-41, Retrieved from the internet: URL: https://ftp.3gpp.org/tsg_sa/WG4_CODEC/TSGS4_106_Busan/Docs/S4-191123.zip 26501-g00-updates-for-SA4-106.doc, [retrieved on Oct. 15, 2019], Sections 4.2, 4.3, Section 6.5.

* cited by examiner

UPLINK AND DOWNLINK STREAMING BIT RATE ASSISTANCE IN 4G AND 5G NETWORKS

RELATED APPLICATIONS

This application claims the benefit of priority to U.S. Provisional Application No. 62/916,451, entitled "Uplink and Downlink Streaming Bit Rate Assistance In 4G and 5G Networks" filed Oct. 17, 2019, the entire contents of which are hereby incorporated herein by reference for all purposes.

BACKGROUND

Long Term Evolution (LTE), 5G new radio (NR), and other recently developed communication technologies allow wireless devices to communicate information at data rates (e.g., in terms of Gigabits per second, etc.) that are orders of magnitude greater than what was available just a few years ago.

Today's communication networks are also more secure, resilient to multipath fading, allow for lower network traffic latencies, provide better communication efficiencies (e.g., in terms of bits per second per unit of bandwidth used, etc.). These and other recent improvements have facilitated the emergence of the Internet of Things (IOT), large scale Machine to Machine (M2M) communication systems, autonomous vehicles, and other technologies that rely on consistent and secure communications.

SUMMARY

Various aspects of the present disclosure include methods, systems, and devices providing streaming service assistance in a fifth generation (5G) system (5GS) network. Various aspects may provide downlink (DL) network assistance (DNA) and/or uplink (UL) network assistance (UNA) mechanisms via an Application Function (AF) performed in an AF network computing device in a 5GS network. Various aspects may enable the reporting of instantaneous and dynamically changing radio access network (RAN) capacity and/or resource status to enable an AF to respond to a boost request from a user equipment (UE) computing device provisioning a streaming service. In some aspects, a service-based interface (SBI) or reference point may be established between an AF and the RAN such that the RAN may provide notification of real-time capacity or excess capacity information to the AF network computing device regarding one or more packet flows or Quality of Service (QoS) flows of an AF session to which a protocol data unit (PDU) session is bound. In some aspects, real-time capacity or excess capacity information of the RAN may be delivered to an AF network computing device via an intermediate network function (NF), such as the Access and Mobility Management function (AMF), Session Management function (SMF), etc. In some aspects, a UE computing device and/or the AF may inform the RAN about needs for capacity for downlink or uplink traffic.

Various aspects may include a method for providing streaming service assistance in a 5GS network performed by a processor of an AF network computing device. Various aspects may include receiving a network assistance request from a streaming service application running on a processor of a user equipment (UE) computing device connected to a 5G radio access network (RAN), sending a RAN capacity request to a network computing device of a 5GS network including the 5G RAN in response to receiving the network assistance request, receiving a RAN capacity notification from the network computing device of the 5GS network in response to sending the RAN capacity request, generating a network assistance response based at least in part on the RAN capacity notification, and sending the network assistance response to the streaming service application running on the processor of the UE computing device.

In some aspects, sending the RAN capacity request to a network computing device of a 5GS network including the 5G RAN may include sending the RAN capacity request to a network computing device of the 5GS network that is also a computing device of the 5G RAN. In some aspects, sending the RAN capacity request to a network computing device of the 5GS network that is also a computing device of the 5G RAN may include sending the RAN capacity request to a network computing device of the 5GS network that is also a computing device of the 5G RAN via a direct interface between the processor of the AF network computing device and the network computing device of the 5GS network that is also a computing device of the 5G RAN, and receiving the RAN capacity notification may include receiving the RAN capacity notification, by the processor of the AF network computing device, from the network computing device of the 5GS network that is also a computing device of the 5G RAN via the direct interface. In some aspects, the RAN capacity request may be a subscription request to receive RAN capacity notifications for a PDU session or a QoS flow associated with the UE computing device.

In some aspects, sending the RAN capacity request to a network computing device of a 5GS network including the 5G RAN may include sending the RAN capacity request to a network computing device of the 5GS network that is not part of the 5G RAN. In some aspects, receiving the RAN capacity notification may include receiving the RAN capacity notification from the network computing device of the 5GS network that is not part of the 5G RAN.

In some aspects, sending the RAN capacity request to the network computing device of the 5GS network may include sending the RAN capacity request to one or more of an AMF computing device that is not part of the 5G RAN, a PCF computing device that is not part of the 5G RAN, or a SMF computing device that is not part of the 5G RAN.

Some aspects may further include sending a capacity need message to a computing device of the 5G RAN, wherein the capacity need message identifies an amount of data to be transferred during a streaming session, or during one or more intervals of a streaming session, for the UE computing device connected to the 5G RAN. In some aspects, the capacity need message may further identify a time window for applicability of the capacity need message, an identifier of the UE computing device connected to the 5G RAN, an identifier of a PDU session that is the streaming session, an identifier of a QoS Flow within that PDU session, or an identifier of the AF network computing device. In some aspects, the RAN capacity request may be configured to be a resource allocation for the streaming session, or one or more intervals within the streaming session, based at least in part on the capacity need message.

In some aspects, receiving the network assistance request from the streaming service application running on the processor of the UE computing device connected to the 5G RAN may include receiving the network assistance request from an uplink streaming service application running on the processor of the UE computing device connected to the 5G RAN or a downlink streaming service application running on the processor of the UE computing device connected to the 5G RAN.

In some aspects, sending the RAN capacity request to the network computing device of the 5GS network including the 5G RAN may include sending the RAN capacity request to one or more of a 5G new radio base station (gNodeB), an Access and Mobility Management function (AMF) computing device, a Policy Control Function (PCF) computing device, or a Session Management function (SMF) computing device.

In some aspects, receiving the network assistance request from the streaming service application running on the processor of the UE computing device connected to the 5G RAN may include receiving a DNA request or a UNA request from the streaming service application running on the processor of the UE computing device connected to the 5G RAN.

In some aspects, receiving the network assistance request may include receiving a request for a recommendation of an operational bitrate prior to an initiation of a streaming session. In some aspects, receiving the network assistance request may include receiving a request for a higher bitrate for a streaming session.

In some aspects, generating the network assistance response based at least in part on the RAN capacity notification may include generating the network assistance response to indicate a recommended bitrate for a streaming session based at least in part on the RAN capacity notification.

Further aspects may include a wireless device having a processor configured to perform one or more operations of any of the methods summarized above. Further aspects may include a non-transitory processor-readable storage medium having stored thereon processor-executable instructions configured to cause a processor of a wireless device to perform operations of any of the methods summarized above. Further aspects include a wireless device having means for performing functions of any of the methods summarized above. Further aspects include a system on chip for use in a wireless device that includes a processor configured to perform one or more operations of any of the methods summarized above. Further aspects include a system in a package that includes two systems on chip for use in a wireless device that includes a processor configured to perform one or more operations of any of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Figure 1:
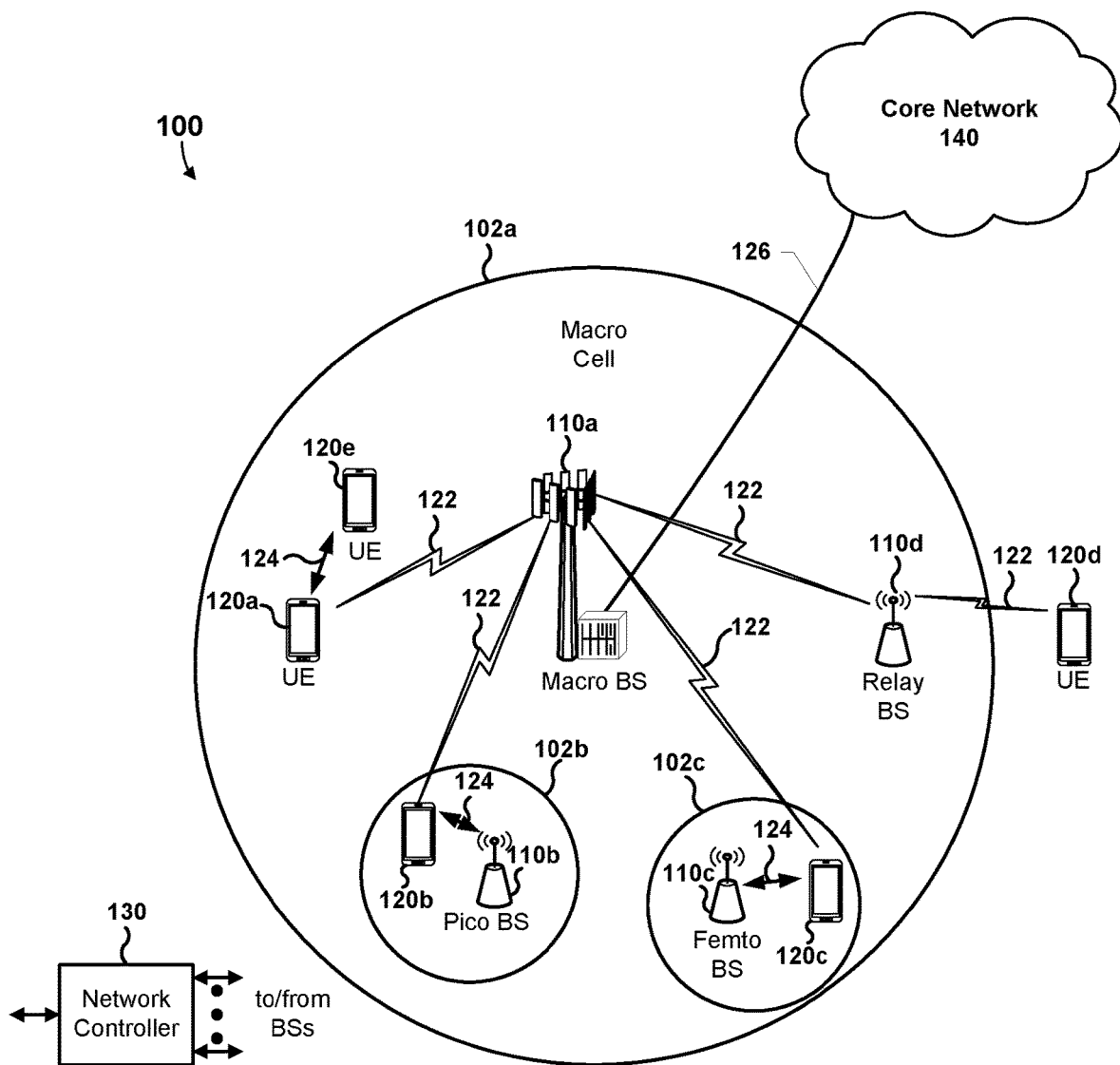
FIG. 1 is a system block diagram conceptually illustrating an example communications system.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments provide methods that may be implemented in an application function (AF) network computing device in a 5GS network to provide downlink (DL) network assistance (DNA) and/or uplink (UL) network assistance (UNA) to user equipment (UE) computing devices in the 5GS network. Various embodiments enable the AF network computing device to obtain and report to UE computing devices reporting of instantaneous and dynamically changing radio access network (RAN) capacity and/or resource status in response to a boost request from a UE computing device accessing a streaming service. Methods include establishing a service-based interface (SBI) or reference point between an AF and the RAN through which the RAN may provide notification of real-time capacity or excess capacity information to the AF network computing device. In some embodiments, real-time capacity or excess capacity information of the RAN may be delivered to the AF network computing device via an intermediate network function (NF), such as the Access and Mobility Management function (AMF), Session Management function (SMF), Policy Control Function (PCF), etc. In some embodiments, a UE computing device and/or the AF network computing device may inform the RAN about needs for capacity for downlink or uplink traffic.

The term "wireless device" is used herein to refer to any one or all of wireless router devices, wireless appliances, cellular telephones, smartphones, portable computing devices, personal or mobile multi-media players, laptop computers, tablet computers, smartbooks, ultrabooks, palmtop computers, wireless electronic mail receivers, multimedia Internet-enabled cellular telephones, medical devices and equipment, biometric sensors/devices, wearable devices including smart watches, smart clothing, smart glasses, smart wrist bands, smart jewelry (e.g., smart rings, smart bracelets, etc.), entertainment devices (e.g., wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within autonomous and semiautonomous vehicles, wireless devices affixed to or incorporated into various mobile platforms, global positioning system devices, and similar electronic devices that include a memory, wireless communication components and a programmable processor.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single wireless device. The proximity of the SOCs facilitates high speed communications and the sharing of memory and resources.

The term "multicore processor" may be used herein to refer to a single integrated circuit (IC) chip or chip package that contains two or more independent processing cores (e.g., CPU core, Internet protocol (IP) core, graphics processor unit (GPU) core, etc.) configured to read and execute program instructions. A SOC may include multiple multicore processors, and each processor in an SOC may be referred to as a core. The term "multiprocessor" may be used herein to refer to a system or device that includes two or more processing units configured to read and execute program instructions.

Streaming services, such as live uplink streaming (LUS) services, e.g., Facebook Live, YouTube Live, Twitch, Periscope, Instagram Live, etc., may be support in fourth generation (4G) and fifth generation (5G) system (5GS) networks. In such user-generated live uplink streaming services, users, via their computing devices, can stream media content, such as video content, audio content, etc., to a network server associated with the live uplink streaming service. A different category of live uplink streaming services may be professionally-generated multimedia content, such as real-time video and audio feeds associated with breaking news reporting in the field, audio/visual streaming of sports events produced by venue-based cameras, etc. Regardless of the category of the live uplink streaming services (e.g., user-generated or professionally-generated), in live uplink streaming services, the streamed (or uploaded) content is in turn made available for viewing by other users via their respective computing devices. Both uplink and downlink network capacity can support upstream delivery and/or downlink distribution of media content in LUS services.

Network assistance may be a function supported for streaming services. Network assistance may enable a UE to ask a Network Assistance Service (NAssS) whether a higher bitrate in UE reception or transmission (referred to as a "boost") can be supported, as well as to request a recommendation of an operational bitrate prior to a session starting. A UE receiving streaming services on the downlink (DL), may be referred to as requesting DL network assistance (DNA), while a UE sending streaming content on the uplink (UL), may be referred to as requesting uplink network assistance (UNA). Boost may be desirable to avoid the UE's media buffer to underflow (in DL reception) or overflow (in UL transmission) by allowing a higher bitrate to be used for DL reception or UL transmission. Network assistance requests may be messages sent by UEs asking whether an increase in the bitrate is supported by a radio access network (RAN) (e.g., a boost request) or messages sent by UEs asking for a recommended bitrate for a streaming session (uplink or downlink recommended bitrate). Network assistance responses may be messages received by a UE indicating a recommended bitrate for a streaming session and/or an ability to support an increase in the bitrate (e.g., a boost status).

Methods, systems, and devices of the various embodiments provide streaming service assistance in a 5GS network. Various embodiments may provide DNA and/or UNA mechanisms via an AF network computing device in a 5GS network. In various embodiments, the AF network computing device may be a Network Assistance Service (NAssS). Various embodiments may enable the reporting of instantaneous and dynamically changing radio access network (RAN) capacity and/or resource status to enable an AF network computing device to respond to a boost request from a user equipment (UE) computing device provisioning a streaming service. Various embodiments may enable an AF (or NAssS) to provide desired network assistance to a requesting UE.

In some embodiments, a service-based interface (SBI) or reference point may be established between an AF network computing device and the RAN such that the RAN may provide notification of real-time capacity or excess capacity information to the AF network computing device regarding one or more packet flows or QoS flows of an AF session to which a protocol data unit (PDU) session is bound. In some embodiments, a RAN may provide notification of real-time capacity or excess capacity information to the AF network computing device, regarding one or more packet flows or QoS flows of individual AF sessions to which a PDU session is bound. In some embodiments, the information may be delivered directly to the AF network computing device from the RAN via a direct interface, such as an SBI or reference point between the AF network computing device and the RAN. As a specific example, the information may be delivered directly to the AF network computing device from the RAN via an SBI-based NF service exposed by the RAN and accessible by the AF network computing device. As another specific example, the information may be delivered directly to the AF network computing device from the RAN via a reference point Nx between the RAN and the AF network computing device. In some embodiments, a SBI-based $N_{ran}$_Capacity_subscribe service operation may be provided by a RAN for an AF network computing device to subscribe to the notification of real-time excess RAN capacity available for the packet flow (within the parent Service Data Flow) identified in the subscription request, and which is sent whenever the RAN capacity value has changed by X % relative to the previous notification. The $N_{ran}$_Capacity_subscribe service operation may require the NF_Id and PDU_Session_Id as inputs, and optional inputs may include QoSType, QFI, QoSProfile, and/or QoSRules. The output of the $N_{ran}$_Capacity_subscribe service operation may be a subscription correlation ID if the subscription is successful or a failure code in the subscription is unsuccessful. An SBI or reference point may be established between an AF network computing device and the RAN such that the RAN may provide notification of real-time capacity or excess capacity information to the AF network computing device regarding one or more packet flows or QoS flows of AF sessions to which a PDU session is bound. This may enable direct exposure of RAN information to the AF network computing device, which may reduce (e.g., minimize) the delay and increase (e.g., maximize) the opportunity to make use of the instantaneously available capacity.

In some embodiments, real-time capacity or excess capacity information of the RAN may be delivered to an AF network computing device via an intermediate network function (NF), such as the Access and Mobility Management function (AMF), Session Management function (SMF), etc. In various embodiments, another NF function, such as the AMF, may act as a proxy for the (R)AN signalling of instantaneous capacity availability. For example, the N2InfoNotify service operation may be extended such that the N2RanInformation element is extended with InstCapacityAvailability (ICA) Information Element (IE). In some embodiments, InstCapacityAvailability may include an element "pduSessionId" that may be an identifier of the PDU session for which the ICA is available, an element "qfi" that may be an identifier of the QoS Flow within the PDU Session named by "pduSessionId," the availability window start and end time during which the additional capacity is available, and the anticipated amount of downlink and/or uplink data that can be carried during the availability window. As an example, the AF network computing device or SMF may subscribe to this InstCapacityAvailability notification for a particular UE and a PDU session of that UE. As another example, the AF network computing device or SMF may subscribe to this InstCapacityAvailability notification for a particular UE, a PDU session of that UE, and a packet flow belonging to a Service Data Flow of that PDU session. In some embodiments, the N2 interface may also be extended to support this signalling. For example, the Next Generation Radio Access Network (NG-RAN) Application Protocol (NGAP) may be used to carry the InstCapacityAvailability notification. The AMF may send the ICA request to the NG-RAN to ask for reporting of instantaneous capacity availability. The NG-RAN may use the ICA REPORT message to inform the AMF about availability. In some embodiments, an AF network computing device may receive notifications through the SMF (e.g., via an extension to the Nsmf_EventExposure_Notify service operation), which in turn is received from the AMF (e.g., via an extension to the Namf_EventExposure_Notify service operation). In some embodiments, the RAN may report general capacity scheduling to the AF network computing device in addition to and/or instead of the instantaneous opportunity.

In some embodiments, a UE computing device and/or the AF network computing device may inform the RAN about needs for capacity for downlink or uplink traffic, such as via a capacity need message identifying an amount of data to be transferred during an entire streaming session for UE. In some other embodiments, a UE computing device and/or the AF network computing device may inform the RAN about needs for capacity for downlink or uplink traffic, such as via a capacity need message identifying an amount of data to be transferred during specified intervals of a streaming session for the UE. As an example, a UE specific message may be defined in the NGAP protocol and the N1N2MessageTransfer procedure may be used by the AF network computing device to send information to the RAN about the UE. The information element that may be the capacity need message may include an indication of a time window for the applicability of the UE's session information or a time window for the applicability of a specified duration of the UE's session information, the approximate amount of data that may be transferred for uplink and downlink, an identifier of the UE and PDU session, and/or an identifier of the Media AF network computing device. A UE computing device and/or the AF network computing device informing the RAN about needs for capacity for downlink or uplink traffic, such as via a capacity need message, may enable a holistic view of the resource allocation to achieve efficient resource allocation by RAN. Every media session to be supported by the RAN may share its short term resource needs for efficient allocation of resources by the RAN. In some embodiments, the AF network computing device, such as the Media AF network computing device (e.g., a Media AF network computing device that is part of a trusted data network (DN) or an external DN in a 5G media streaming architecture), may share this information through a message (e.g., the capacity need message) with the AMF, which may in turn shares it with the relevant RAN. In some other embodiments, the AF network computing device, such as the NAssS, may share this information through a message (e.g., the capacity need message) with the AMF, which may in turn share the information and/or the message with the relevant RAN. Similarly, the UE may share the information through a message (e.g., the capacity need message) sent directly to the RAN.

FIG. 1 illustrates an example of a communications system 100 that is suitable for implementing various embodiments. The communications system 100 may be an 5G NR network, or any other suitable network such as an LTE network.

The communications system 100 may include a heterogeneous network architecture that includes a core network 140 and a variety of mobile devices (also referred to as user equipment (UE) computing devices) (illustrated as wireless device 120a-120e in FIG. 1). The communications system 100 may also include a number of base stations (illustrated as the BS 110a, the BS 110b, the BS 110c, and the BS 110d) and other network entities. A base station is an entity that communicates with wireless devices (mobile devices or UE computing devices), and also may be referred to as an NodeB, a Node B, an LTE evolved nodeB (eNB), an Access point (AP), a radio head, a transmit receive point (TRP), a New Radio base station (NR BS), a 5G NodeB (NB), a Next Generation NodeB (gNB), or the like. Each base station may provide communication coverage for a particular geographic area. In 3GPP, the term "cell" can refer to a coverage area of a base station, a base station subsystem serving this coverage area, or a combination thereof, depending on the context in which the term is used.

A base station 110a-110d may provide communication coverage for a macro cell, a pico cell, a femto cell, another type of cell, or a combination thereof. A macro cell may cover a relatively large geographic area (for example, several kilometers in radius) and may allow unrestricted Access by mobile devices with service subscription. A pico cell may cover a relatively small geographic area and may allow unrestricted Access by mobile devices with service subscription. A femto cell may cover a relatively small geographic area (for example, a home) and may allow restricted Access by mobile devices having association with the femto cell (for example, mobile devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1, a base station 110a may be a macro BS for a macro cell 102a, a base station 110b may be a pico BS for a pico cell 102b, and a base station 110c may be a femto BS for a femto cell 102c. A base station 110a-110d may support one or multiple (for example, three) cells. The terms "eNB", "base station", "NR BS", "gNB", "TRP", "AP", "node B", "5G NB", and "cell" may be used interchangeably herein.

In some examples, a cell may not be stationary, and the geographic area of the cell may move according to the location of a mobile base station. In some examples, the base stations 110a-110d may be interconnected to one another as well as to one or more other base stations or network nodes (not illustrated) in the communications system 100 through various types of backhaul interfaces, such as a direct physical connection, a virtual network, or a combination thereof using any suitable transport network.

The base station 110a-110d may communicate with the core network 140 over a wired or wireless communication link 126. The wireless device 120a-120e (UE computing device) may communicate with the base station 110a-110d over a wireless communication link 122.

The wired communication link 126 may use a variety of wired networks (e.g., Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communications system 100 also may include relay stations (e.g., relay BS 110d). A relay station is an entity that can receive a transmission of data from an upstream station (for example, a base station or a mobile device) and send a transmission of the data to a downstream station (for example, a wireless device or a base station). A relay station also may be a mobile device that can relay transmissions for other wireless devices. In the example illustrated in FIG. 1, a relay station 110d may communicate with macro the base station 110a and the wireless device 120d in order to facilitate communication between the base station 110a and the wireless device 120d. A relay station also may be referred to as a relay base station, a relay base station, a relay, etc.

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts) whereas pico base stations, femto base stations, and relay base stations may have lower transmit power levels (for example, 0.1 to 2 Watts).

A network controller 130 may couple to a set of base stations and may provide coordination and Control for these base stations. The network controller 130 may communicate with the base stations via a backhaul. The base stations also may communicate with one another, for example, directly or indirectly via a wireless or wireline backhaul.

The wireless devices (UE computing devices) 120a, 120b, 120c may be dispersed throughout communications system 100, and each wireless device may be stationary or mobile. A wireless device also may be referred to as an Access terminal, a UE, a terminal, a mobile station, a subscriber unit, a station, etc.

A macro base station 110a may communicate with the communication network 140 over a wired or wireless communication link 126. The wireless devices 120a, 120b, 120c may communicate with a base station 110a-110d over a wireless communication link 122.

The wireless communication links 122, 124 may include a plurality of carrier signals, frequencies, or frequency bands, each of which may include a plurality of logical channels. The wireless communication links 122 and 124 may utilize one or more radio Access technologies (RATs). Examples of RATs that may be used in a wireless communication link include 3GPP LTE, 3G, 4G, 5G (e.g., NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links 122, 124 within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While descriptions of some embodiments may use tell sinology and examples associated with LTE technologies, various embodiments may be applicable to other wireless communications systems, such as a new radio (NR) or 5G network. NR may utilize OFDM with a cyclic prefix (CP) on the uplink (UL) and downlink (DL) and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL Control data. Beamforming may be supported and beam direction may be dynamically configured. Multiple Input Multiple Output (MIMO) transmissions with precoding may also be supported. MIMO configurations in the DL may support up to eight transmit antennas with multi-layer DL transmissions up to eight streams and up to two streams per wireless device. Multi-layer transmissions with up to 2 streams per wireless device may be supported. Aggregation of multiple cells may be supported with up to eight serving cells. Alternatively, NR may support a different air interface, other than an OFDM-based air interface.

Some mobile devices may be considered machine-type communication (MTC) or evolved or enhanced machine-type communication (eMTC) mobile devices. MTC and eMTC mobile devices include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some mobile devices may be considered Internet-of-Things (IoT) devices or may be implemented as NB-IoT (narrowband Internet of things) devices. A wireless device 120*a*-*e* may be included inside a housing that houses components of the wireless device, such as processor components, memory components, similar components, or a combination thereof.

In general, any number of communications systems and any number of wireless networks may be deployed in a given geographic area. Each communications system and wireless network may support a particular radio Access technology (RAT) and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, NR or 5G RAT networks may be deployed.

In some implementations, two or more mobile devices 120*a*-*e* (for example, illustrated as the wireless device 120*a* and the wireless device 120*e*) may communicate directly using one or more sidelink channels 124 (for example, without using a base station 110*a*-110*d* as an intermediary to communicate with one another). For example, the wireless devices 120*a*-*e* may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the wireless device 120*a*-*e* may perform scheduling operations, resource selection operations, as well as other operations described elsewhere herein as being performed by the base station 110*a*-110*d*.

Figure 2:
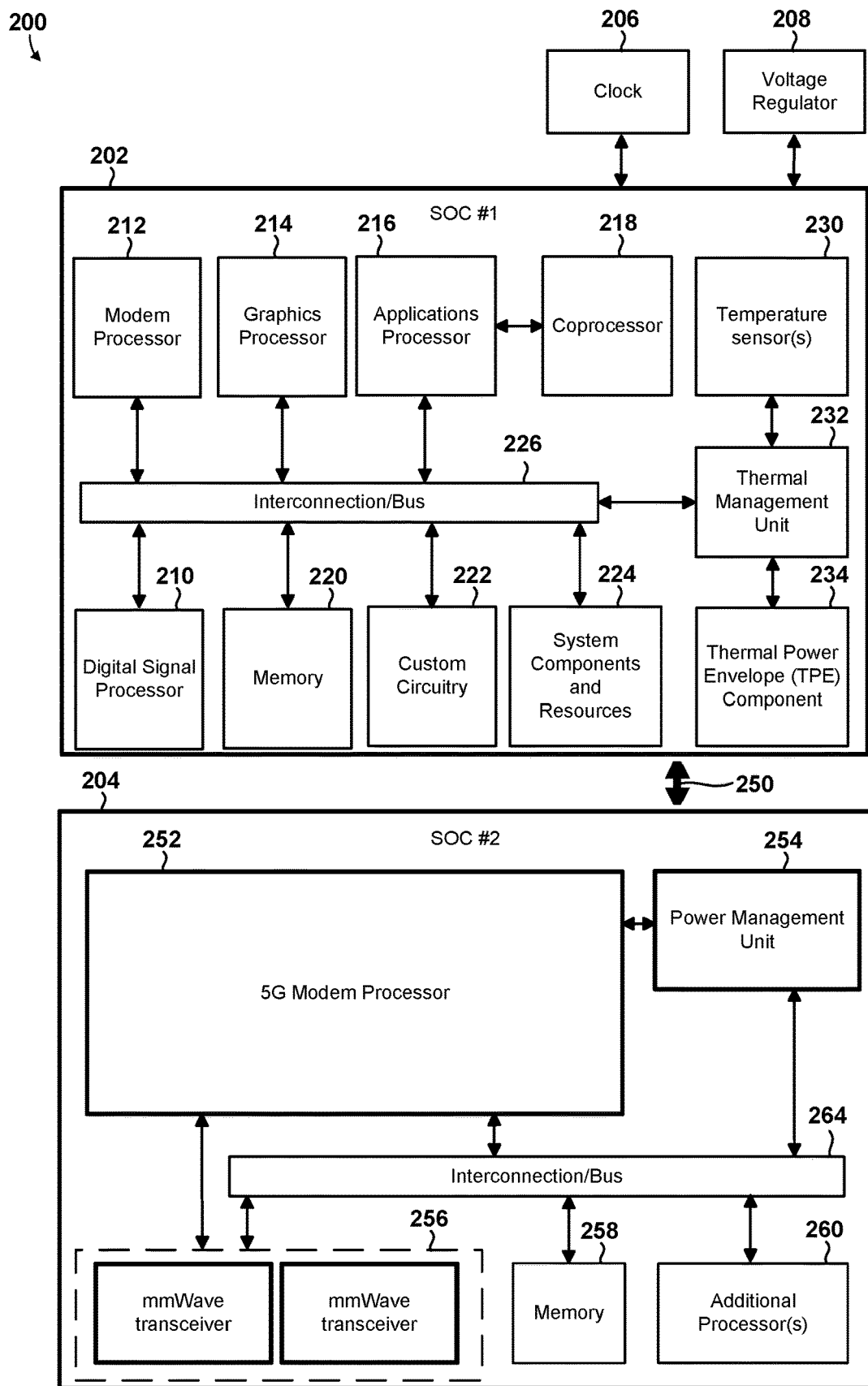
FIG. 2 is a component block diagram illustrating a computing system that may be configured to implement streaming service assistance in accordance with various embodiments.

Various embodiments may be implemented on a number of single processor and multiprocessor computer systems, including a system-on-chip (SOC) or system in a package (SIP). FIG. 2 illustrates an example computing system or SIP 200 architecture that may be used in wireless devices (UE computing devices) implementing the various embodiments.

With reference to FIGS. 1 and 2, the illustrated example SIP 200 includes a two SOCs 202, 204, a clock 206, and a voltage regulator 208. In some embodiments, the first SOC 202 operate as central processing unit (CPU) of the wireless device that carries out the instructions of software application programs by performing the arithmetic, logical, Control and input/output (I/O) operations specified by the instructions. In some embodiments, the second SOC 204 may operate as a specialized processing unit. For example, the second SOC 204 may operate as a specialized 5G processing unit responsible for managing high volume, high speed (e.g., 5 Gbps, etc.), and/or very high frequency short wave length (e.g., 28 GHz mmWave spectrum, etc.) communications.

The first SOC 202 may include a digital signal processor (DSP) 210, a modem processor 212, a graphics processor 214, an application processor 216, one or more coprocessors 218 (e.g., vector co-processor) connected to one or more of the processors, memory 220, custom circuitry 222, system components and resources 224, an interconnection/bus module 226, one or more temperature sensors 230, a thermal Management unit 232, and a thermal power envelope (TPE) component 234. The second SOC 204 may include a 5G modem processor 252, a power Management unit 254, an interconnection/bus module 264, a plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (e.g., FreeBSD, LINUX, OS X, etc.) and a processor that executes a second type of operating system (e.g., MICROSOFT WINDOWS 10). In addition, any or all of the processors 210, 212, 214, 216, 218, 252, 260 may be included as part of a processor cluster architecture (e.g., a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, Access ports, timers, and other similar components used to support the processors and software clients running on a wireless device. The system components and resources 224 and/or custom circuitry 222 may also include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal Management unit 232 via an interconnection/bus module 226. Similarly, the processor 252 may be interconnected to the power Management unit 254, the mmWave transceivers 256, memory 258, and various additional processors 260 via the interconnection/bus module 264. The interconnection/bus module 226, 250, 264 may include an array of reconfigurable logic gates and/or implement a bus architecture (e.g., CoreConnect, AMBA, etc.). Communications may be provided by advanced interconnects, such as high-performance networks-on chip (NoCs).

The first and/or second SOCs 202, 204 may further include an input/output module (not illustrated) for communicating with resources external to the SOC, such as a clock 206 and a voltage regulator 208. Resources external to the SOC (e.g., clock 206, voltage regulator 208) may be shared by two or more of the internal SOC processors/cores.

In addition to the example SIP 200 discussed above, various embodiments may be implemented in a wide variety of computing systems, which may include a single processor, multiple processors, multicore processors, or any combination thereof.

Figure 3:
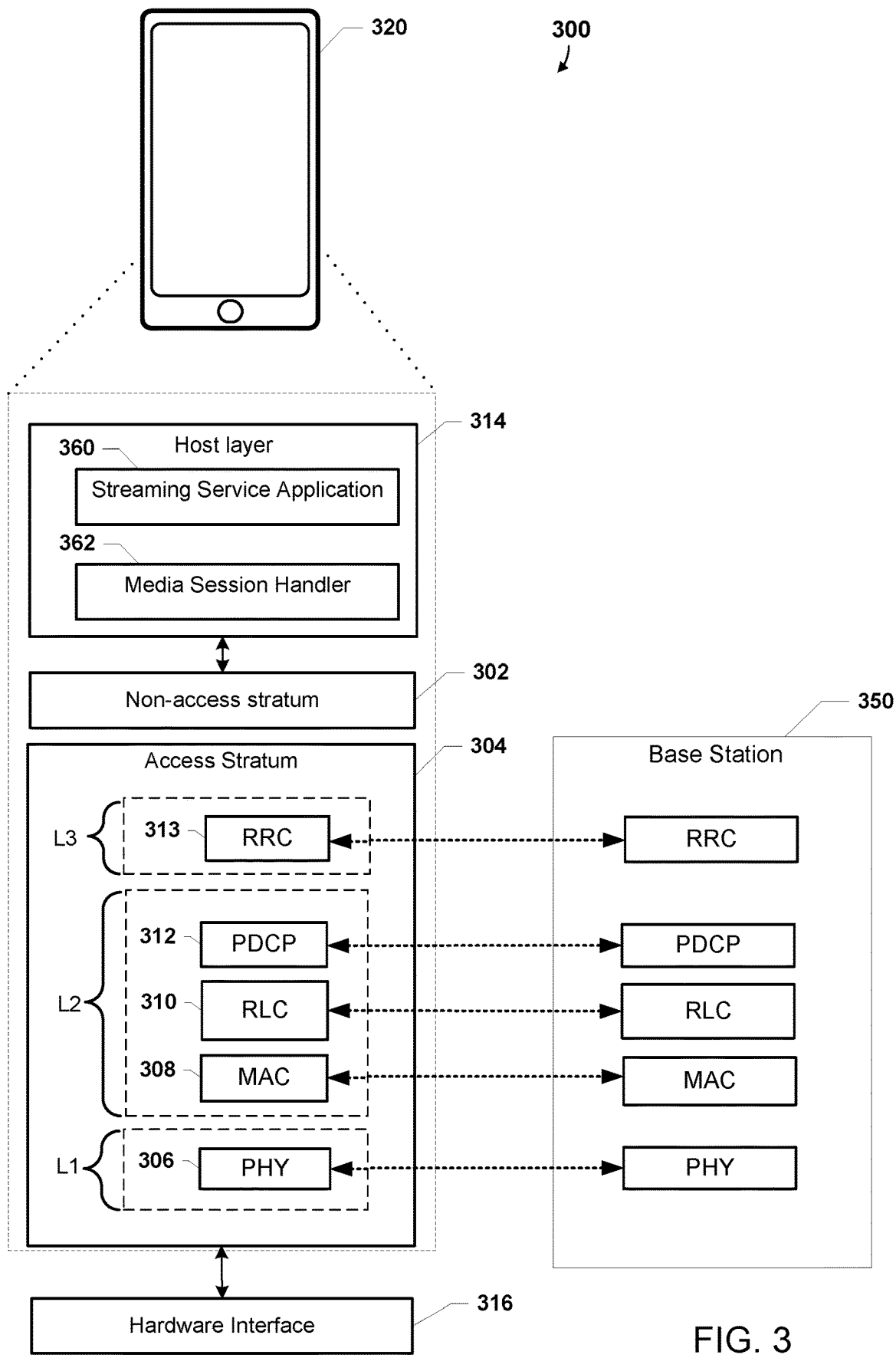
FIG. 3 is a diagram illustrating an example of a software architecture including a radio protocol stack for the user and control planes in wireless communications in accordance with various embodiments.

FIG. 3 illustrates an example of a software architecture 300 including a radio protocol stack for the user and Control planes in wireless communications between a base station 350 (e.g., the base station 110a-110d) and a wireless device (UE computing device) 320 (e.g., the wireless device 120a-120e, 200). With reference to FIGS. 1-3, the wireless device 320 may implement the software architecture 300 to communicate with the base station 350 of a communication system (e.g., 100). In various embodiments, layers in software architecture 300 may form logical connections with corresponding layers in software of the base station 350. The software architecture 300 may be distributed among one or more processors (e.g., the processors 212, 214, 216, 218, 252, 260). While illustrated with respect to one radio protocol stack, in a multi-SIM (subscriber identity module) wireless device, the software architecture 300 may include multiple protocol stacks, each of which may be associated with a different SIM (e.g., two protocol stacks associated with two SIMs, respectively, in a dual-SIM wireless communication device). While described below with reference to LTE communication layers, the software architecture 300 may support any of variety of standards and protocols for wireless communications, and/or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support packet filtering, security Management, Mobility Control, Session Management, and traffic and signaling between a SIM(s) of the wireless device (e.g., SIM(s) 204) and its core network 140. The AS 304 may include functions and protocols that support communication between a SIM(s) (e.g., SIM(s) 204) and entities of supported Access networks (e.g., a base station). In particular, the AS 304 may include at least three layers (Layer 1, Layer 2, and Layer 3), each of which may contain various sub-layers.

In the user and Control planes, Layer 1 (L1) of the AS 304 may be a physical layer (PHY) 306, which may oversee functions that enable transmission and/or reception over the air interface. Examples of such physical layer 306 functions may include cyclic redundancy check (CRC) attachment, coding blocks, scrambling and descrambling, modulation and demodulation, signal measurements, MIMO, etc. The physical layer may include various logical channels, including the Physical Downlink Control Channel (PDCCH) and the Physical Downlink Shared Channel (PDSCH).

In the user and Control planes, Layer 2 (L2) of the AS 304 may be responsible for the link between the wireless device 320 and the base station 350 over the physical layer 306. In the various embodiments, Layer 2 may include a media Access Control (MAC) sublayer 308, a radio link Control (RLC) sublayer 310, and a packet data convergence protocol (PDCP) 312 sublayer, each of which form logical connections terminating at the base station 350.

In the Control plane, Layer 3 (L3) of the AS 304 may include a radio resource Control (RRC) sublayer 3. While not shown, the software architecture 300 may include additional Layer 3 sublayers, as well as various upper layers above Layer 3. In various embodiments, the RRC sublayer 313 may provide functions INCLUDING broadcasting system information, paging, and establishing and releasing an RRC signaling connection between the wireless device 320 and the base station 350.

In various embodiments, the PDCP sublayer 312 may provide uplink functions including multiplexing between different radio bearers and logical channels, sequence number addition, handover data handling, integrity protection, ciphering, and header compression. In the downlink, the PDCP sublayer 312 may provide functions that include in-sequence delivery of data packets, duplicate data packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random Access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the wireless device 320. In some embodiments, application-specific functions provided by the at least one host layer 314 may provide an interface between the software architecture and the general purpose processor. As examples, the host layer 314 may provide various functions including streaming service application functions 360, such as downlink streaming service application functions and/or uplink streaming service application functions, media session handler functions 362, media player entities, etc. Such streaming service application functions 360 and/or media handler functions 362 may operate together to provision streaming services (e.g., uplink streaming services, downlink streaming services, etc.) on the wireless device 320.

In other embodiments, the software architecture 300 may include one or more higher logical layer (e.g., transport, Session, presentation, application, etc.) that provide host layer functions. For example, in some embodiments, the software architecture 300 may include a network layer (e.g., IP layer) in which a logical connection terminates at an external packet data network (PDN) gateway (PGW) in a mobile operator's network. In some embodiments, the software architecture 300 may include an application layer in which a logical connection terminates at another device (e.g., end user device, server, etc.). In some embodiments, the software architecture 300 may further include in the AS 304 a hardware interface 316 between the physical layer 306 and the communication hardware (e.g., one or more radio frequency (RF) transceivers).

Figure 4:
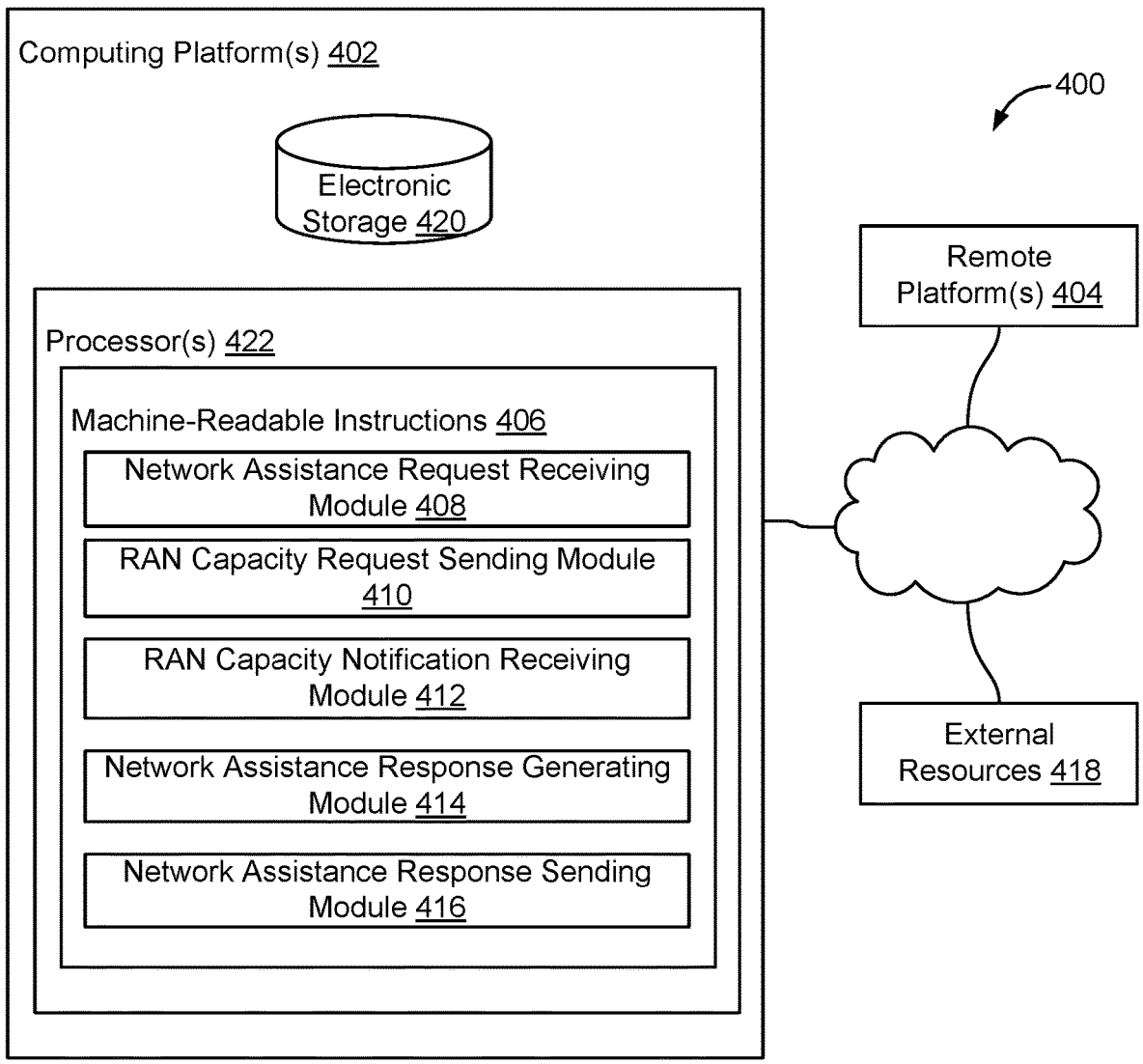
FIG. 4 is a component block diagram illustrating a system configured for providing streaming service assistance in a 5GS network in accordance with various embodiments.

FIG. 4 is a component block diagram illustrating a system 400 configured for providing streaming service assistance in a 5GS network in accordance with various embodiments. In some embodiments, system 400 may include one or more computing platforms 402 and/or one or more remote platforms 404. With reference to FIGS. 1-4, computing platform(s) 402 may include a base station (e.g., the base station 110a-110d, 350) and/or a wireless device (e.g., the wireless device 120a-120e, 200, 320). Remote platform(s) 404 may include a base station (e.g., the base station 110a-110d, 350) and/or a wireless device (e.g., the wireless device 120a-120e, 200, 320).

Computing platform(s) 402 may be configured by machine-readable instructions 406. Machine-readable instructions 406 may include one or more instruction modules. The instruction modules may include computer program modules. The instruction modules may include one or more of network assistance request receiving module 408, RAN capacity request sending module 410, RAN capacity notification receiving module 412, network assistance response generating module 414, network assistance response sending module 416, and/or other instruction modules.

Network assistance request receiving module 408 may be configured to receive a network assistance request from a streaming service application running on a processor of a UE computing device connected to a 5G RAN. The network assistance request may be a downlink (DL) network assistance (DNA) request or an uplink (UL) network assistance (UNA) request. The network assistance request may be a request for a recommendation of an operational bitrate that was sent by the UE computing device prior to the UE computing device initiating a streaming session. The network assistance request may be a request for a higher bitrate for a streaming session. The streaming service application running on the processor of the UE computing device may be an uplink streaming service application or a downlink streaming service application. In some embodiments, network assistance requests may be received directly from a streaming service application running on a processor of a UE computing device. In some embodiments, network assistance requests may be received from a streaming service application running on a processor of a UE computing device via a middleware function running on a processor of the UE computing device. Such a middleware function may be an agent of a streaming service application provisioning a streaming service on a UE computing device, and such agent may sometimes be referred to as a media session handler. Whether received directly from a streaming service application or received via a middleware function that is an agent of the streaming service application (e.g., a media session handler), the network assistance request may be considered to be received from a streaming service application running on a processor of a UE computing device.

RAN capacity request sending module 410 may be configured to send a RAN capacity request to a network computing device of a 5GS network including the 5G RAN in response to receiving the network assistance request. The network computing device of the 5GS network may be a computing device of the 5G RAN. The network computing device of the 5GS network may be a computing device not part of the 5G RAN. In some embodiments, the RAN capacity request may be a direct request from the processor of the AF network computing device to the network computing device of the 5G RAN for capacity for downlink or uplink traffic associated with the amount of data to be transferred during the entire streaming session, or specified intervals of the entire streaming session, of the UE. In some other embodiments, the RAN capacity request may be a subscription by the processor of the AF network computing device to receive notifications of real-time excess RAN capacity from the network computing device of the 5G RAN. By way of non-limiting example, the network computing device of the 5GS network may be a 5G new radio base station (gNodeB), an AMF computing device, a PCF computing device, a SMF, etc.

RAN capacity notification receiving module 412 may be configured to receive a RAN capacity notification from the computing device of the 5GS network in response to sending the RAN capacity request. The RAN capacity request and the RAN capacity notification may be exchanged via a direct interface between the processor of the AF network computing device and the network computing device of the 5G RAN. In some embodiments, the RAN capacity request may be a SBI-based $N_{ran}$_Capacity_subscribe service operation that may be provided by a RAN for an AF network computing device to subscribe to the notification of real-time excess RAN capacity available for the packet flow (within the parent Service Data Flow) identified in the subscription request, and which is sent whenever the RAN capacity value has changed by X % relative to the previous notification. The $N_{ran}$_Capacity_subscribe service operation may require the NF_Id and PDU_Session_Id as inputs, and optional inputs may include QoSType, QFI, QoSProfile, and/or QoSRules. The output of the $N_{ran}$_Capacity_subscribe service operation may be a subscription correlation ID if the subscription is successful or a failure code in the subscription is unsuccessful. The RAN capacity request and the RAN capacity notification may be exchanged between the processor of the AF network computing device and the computing device that is not part of the 5G RAN. The RAN capacity notification may be forwarded from the computing device of the 5G RAN to the processor of the AF network computing device via the computing device not part of the 5G RAN. For example, the N2InfoNotify service operation may be extended such that the N2RanInformation element is extended with InstCapacityAvailability (ICA) Information Element (IE). In some embodiments, InstCapacityAvailability may include an element "pduSessionId" that may be an identifier of the PDU session for which the ICA is available, an element "qfi" that may be an identifier of the QoS Flow within the PDU Session named by "pduSessionId", the availability window start and end time during which the additional capacity is available, and the anticipated amount of downlink and/or uplink data that can be carried during the availability window. The AF network computing device or SMF may subscribes to this InstCapacityAvailability notification for a particular UE or PDU session.

Network assistance response generating module 414 may be configured to generate a network assistance response based at least in part on the RAN capacity notification. The network assistance response may indicate a recommended bitrate for a streaming session.

Network assistance response sending module 416 may be configured to send the network assistance response to the streaming service application running on the processor of the UE computing device. In some embodiments, the network assistance response may be sent directly to the streaming service application running on the processor of the UE computing device. In some embodiments, the network assistance response may be sent to the middleware function (e.g., the media session handler) that may be an agent of the streaming service application provisioning a streaming service on a UE computing device, and the middleware function (e.g., the media session handler) may forward the network assistance response to the streaming service application. Whether sent directly to a streaming service application or sent via a middleware function that is an agent of the streaming service application (e.g., a media session handler), the network assistance response may be considered to be sent to the streaming service application running on the processor of the UE computing device.

Figure 5:
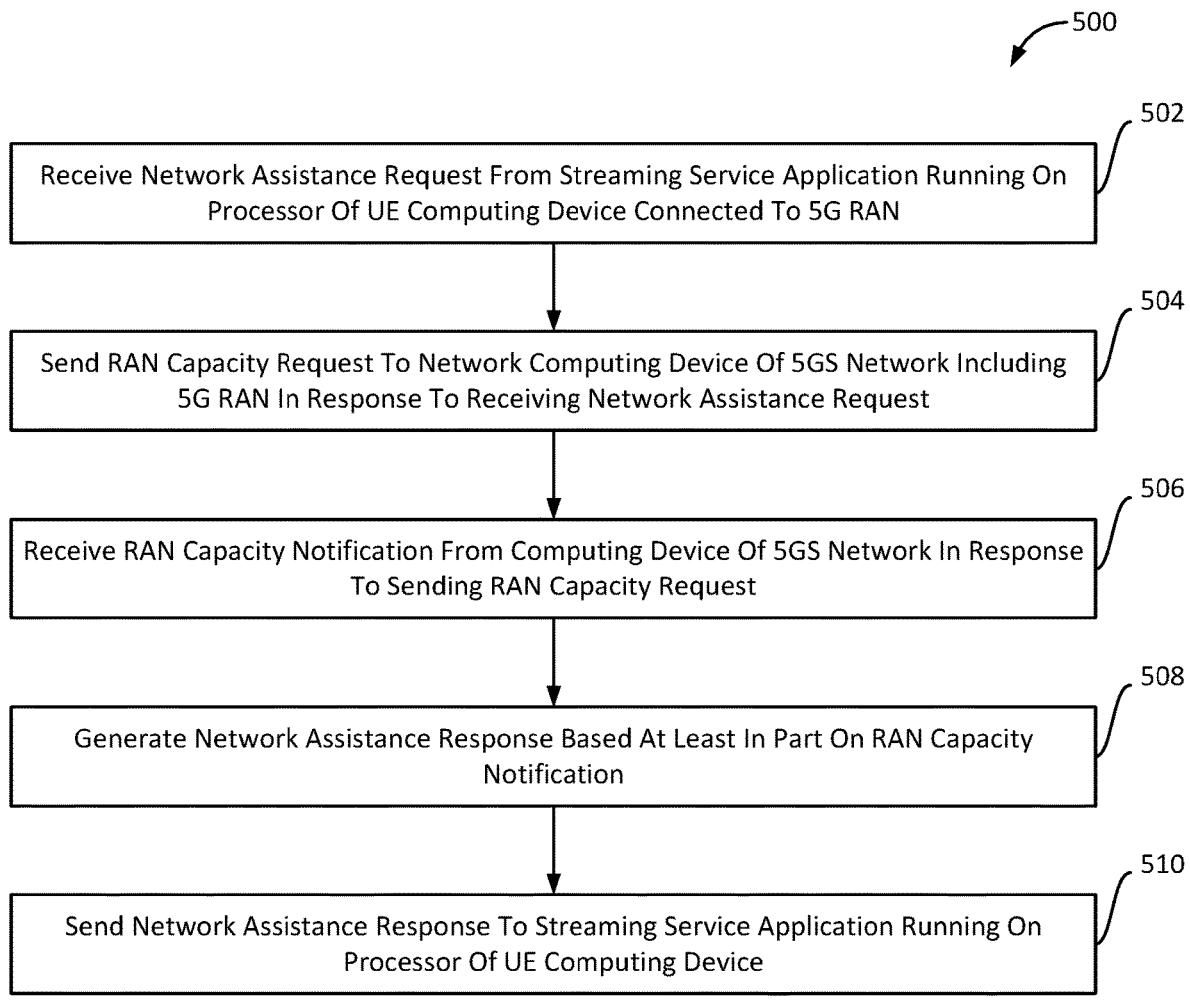
FIG. 5 is a process flow diagram illustrating a method performed by a processor of an AF network computing device for providing streaming service assistance in a 5GS network in accordance with various embodiments.

FIG. 5 shows a process flow diagram of an example method for providing streaming service assistance in a 5GS network according to various embodiments. With reference to FIGS. 1-5, the method 500 may be implemented by a processor a base station (e.g., the base station 110a-110d, 350) and/or a wireless device (e.g., the wireless device 120a-120e, 200, 320).

In block 502, the processor may perform operations including receiving a network assistance request from a streaming service application running on a processor of a UE computing device connected to a 5G RAN. In some embodiments, the network assistance request may be a DNA request or a UNA. In some embodiments, the network assistance request may be a request for a recommendation of an operational bitrate that was sent by the UE computing device prior to the UE computing device initiating a streaming session. In some embodiments, the network assistance request may be a request for a higher bitrate for a streaming session. As an example, the network assistance request may be a bit rate boot request from a UE computing device. In some embodiments, the network assistance request may identify the 5G RAN to which the UE computing device is connected. In some embodiments, the network assistance request may be received directly from the streaming service application running on the processor of the UE computing device. In some embodiments, the network assistance request may be received from the streaming service application running on the processor of the UE computing device via a middleware function running on a processor of the UE computing device (e.g., via a media session handler).

In block 504, the processor may perform operations including sending a RAN capacity request to a network computing device of a 5GS network including the 5G RAN in response to receiving the network assistance request. In some embodiments, sending the RAN capacity request may include determining the 5GS network and/or the 5G RAN to which the UE computing device that sent the network assistance request is connected. In some embodiments, the RAN capacity request may be a subscription by the processor of the AF network computing device to receive notifications of real-time excess RAN capacity from the network computing device of the 5G RAN. In some embodiments, the RAN capacity request may be a subscription request to receive RAN capacity notifications for a PDU session or a QoS flow associated with the UE computing device that sent the network assistance request.

In some embodiments, the RAN capacity request may be sent directly to a network computing device of the 5G RAN, such as a gNodeB, etc. For example, the RAN capacity request may be sent directly via a medium access control (MAC) message from a processor of a UE computing device to a network computing device of the 5G RAN, such as a gNodeB, etc. In some embodiments, a direct interface between the processor of the AF network computing device and the network computing device of the 5G RAN may be established. In some embodiments, an SBI or reference point may be established between an AF network computing device and the RAN such that the RAN may provide notification of real-time capacity or excess capacity information to the AF network computing device regarding one or more packet flows or QoS flows of an AF session to which a PDU session is bound.

In some embodiments, the RAN capacity request and the RAN capacity notification may be sent to a computing device that is not part of the 5G RAN, such as a computing device that is an intermediate NF, such as the AMF, SMF, etc. In various embodiments, another NF function, such as the AMF, may act as a proxy for the (R)AN signalling of instantaneous capacity availability.

In block 506, the processor may perform operations including receiving a RAN capacity notification from the computing device of the 5GS network in response to sending the RAN capacity request.

In some embodiments, the RAN capacity notification may be received via a direct interface between the processor of the AF network computing device and the network computing device of the 5G RAN. In some embodiments, an SBI or reference point may be established between an AF network computing device and the RAN such that the RAN may provide notification of real-time capacity or excess capacity information to the AF network computing device regarding one or more packet flows or QoS flows of an AF session to which a PDU session is bound. As a specific example, the information may be delivered directly to the AF network computing device from the RAN via a service N(r)an exposed by the RAN and accessible by the AF network computing device. As another specific example, the information may be delivered directly to the AF network computing device from the RAN via a reference point Nx between the RAN and the AF network computing device. In some embodiments, a SBI-based $N_{ran}$_Capacity_subscribe service operation may be provided by a RAN for an AF network computing device to subscribe to the notification of real-time excess RAN capacity available for the packet flow (within the parent Service Data Flow) identified in the subscription request, and which is sent whenever the RAN capacity value has changed by X % relative to the previous notification. The $N_{ran}$_Capacity_subscribe service operation may require the NF_Id and PDU_Session_Id as inputs, and optional inputs may include QoSType, QFI, QoSProfile, and/or QoSRules. The output of the $N_{ran}$_Capacity_subscribe service operation may be a subscription correlation ID if the subscription is successful or a failure code in the subscription is unsuccessful.

In some embodiments, the RAN capacity notification may be received by the processor of the AF network computing device from a computing device that is not part of the 5G RAN, such as the AMF, Session Management function (SMF), Policy Control Function (PCF), etc. In various embodiments, another NF function, such as the AMF, may act as a proxy for the (R)AN signalling of instantaneous capacity availability. In some embodiments, the RAN capacity notification may be forwarded from the computing device of the 5G RAN to the processor of the AF network computing device via the computing device that is not part of the 5G RAN. For example, the N2InfoNotify service operation may be extended such that the N2RanInformation element is extended with InstCapacityAvailability (ICA) Information Element (IE). In some embodiments, InstCapacityAvailability may include an element "pduSessionId" that may be an identifier of the PDU session for which the ICA is available, an element "qfi" that may be an identifier of the QoS Flow within the PDU Session named by "pduSessionId", the availability window start and end time during which the additional capacity is available, and the anticipated amount of downlink and/or uplink data that can be carried during the availability window. The AF network computing device or SMF may subscribes to this InstCapacityAvailability notification for a particular UE or PDU session. In some embodiments, the N2 interface may also be extended to support this signalling. For example, the NGAP protocol may be used to carry the InstCapacityAvailability notification. The AMF may send the ICA request to the NG-RAN to ask for reporting of instantaneous capacity availability. The NG-RAN may use the ICA REPORT message to inform the AMF about availability. In some embodiments, an AF network computing device may receive notifications through the SMF (e.g., via an extension to the Nsmf_EventExposure_Notify service operation), which in turn is received from the AMF (e.g., via an extension to the Namf_EventExposure_Notify service operation). In some embodiments, the RAN may report general capacity scheduling to the AF network computing device in addition to and/or instead of the instantaneous opportunity.

In block 508, the processor may perform operations including generating a network assistance response based at least in part on the RAN capacity notification. In some embodiments, the network assistance response may indicate a recommended bitrate for a streaming session and/or a boost status for a streaming session (e.g., whether boost is support or not by a RAN).

In block 510, the processor may perform operations including sending the network assistance response to the streaming service application running on the processor of the UE computing device. In some embodiments, the network assistance response may be sent directly to the streaming service application running on the processor of the UE computing device. In some embodiments, the network assistance response may be sent to the streaming service application running on the processor of the UE computing device via a middleware function running on a processor of the UE computing device (e.g., via a media session handler). The middleware function (e.g., the media session handler) may provide the network assistance response to the streaming service application.

Figure 6A:
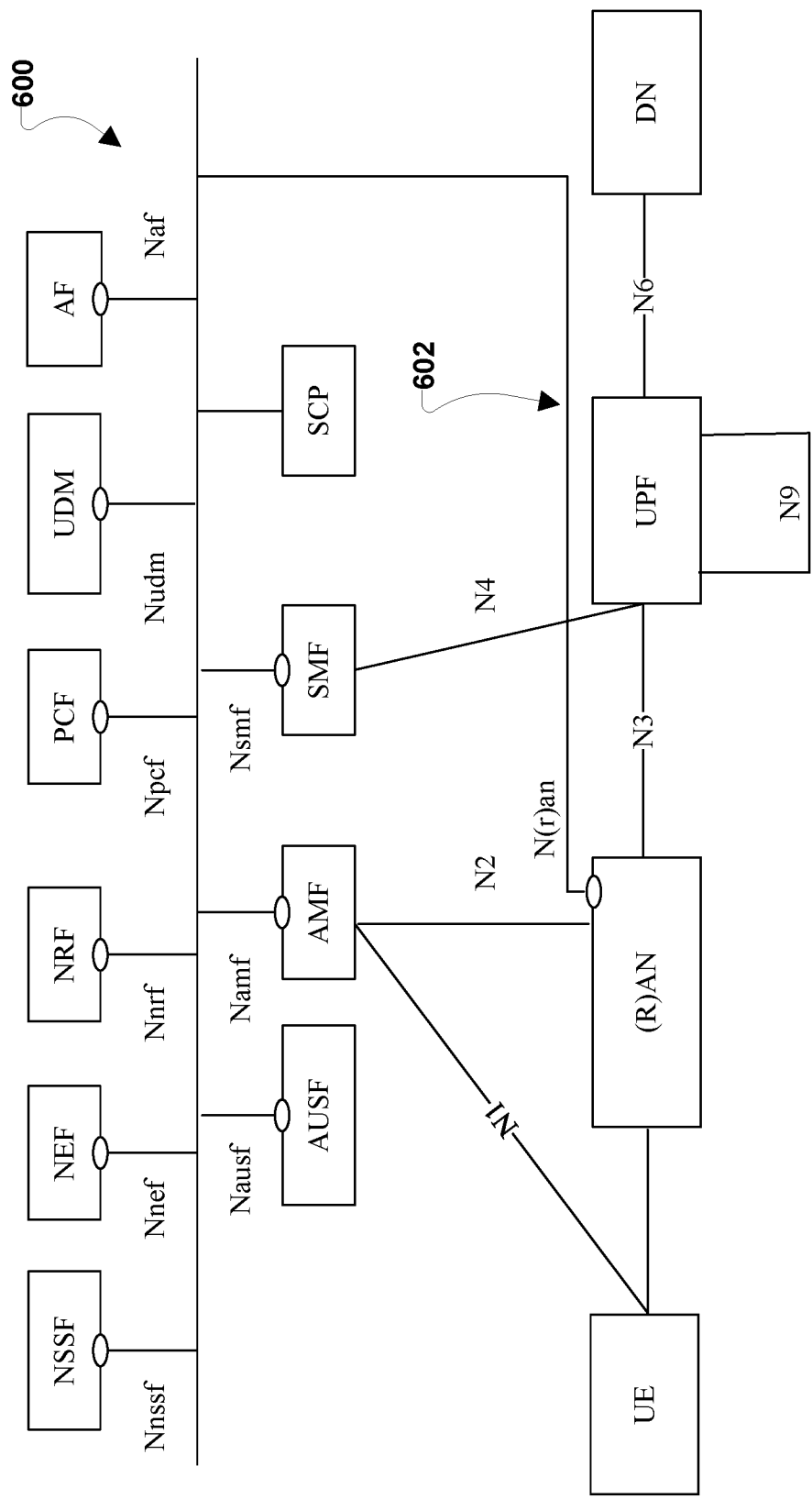
FIG. 6A is a service-based interface (SBI) representation of an embodiment service for supporting streaming service assistance in a 5GS network.

FIG. 6A is an SBI representation 600 of an embodiment service 602 for supporting streaming service assistance in a 5GS network. With reference to FIGS. 1-6A, SBI representation 600 illustrates that RAN capacity notifications may be delivered directly to the AF network computing device from the RAN via a service N(r)an 602 exposed by the RAN and accessible by the AF network computing device. In some embodiments, a SBI-based $N_{ran}$_Capacity_subscribe service operation may be provided by a RAN for an AF network computing device to subscribe to the notification of real-time excess RAN capacity available for the packet flow (within the parent Service Data Flow) identified in the subscription request, and which is sent whenever the RAN capacity value has changed by X % relative to the previous notification. The $N_{ran}$_Capacity_subscribe service operation may require the NF_Id and PDU_Session_Id as inputs, and optional inputs may include QoSType, QFI, QoSProfile, and/or QoSRules. The output of the $N_{ran}$_Capacity_subscribe service operation may be a subscription correlation ID if the subscription is successful or a failure code in the subscription is unsuccessful.

Figure 6B:
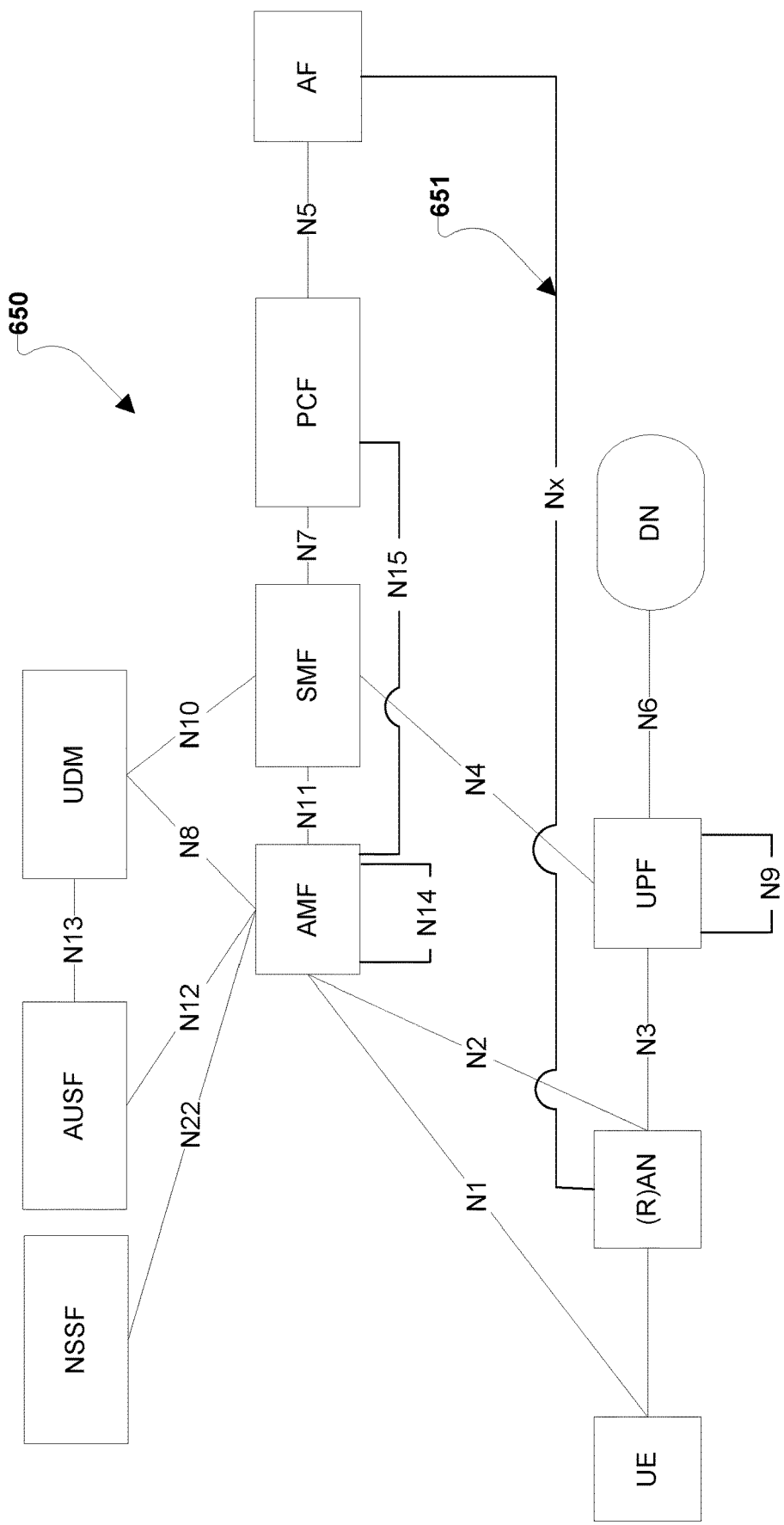
FIG. 6B is a reference point representation of an embodiment reference point for supporting streaming service assistance in a 5GS network.

FIG. 6B is a reference point representation 650 of an embodiment reference point 651 for supporting streaming service assistance in a 5GS network. With reference to FIGS. 1-6B, reference point representation 650 illustrates that that RAN capacity notifications may be delivered directly to the AF network computing device from the RAN via a reference point Nx 651 between the RAN and the AF network computing device.

Figure 7A:
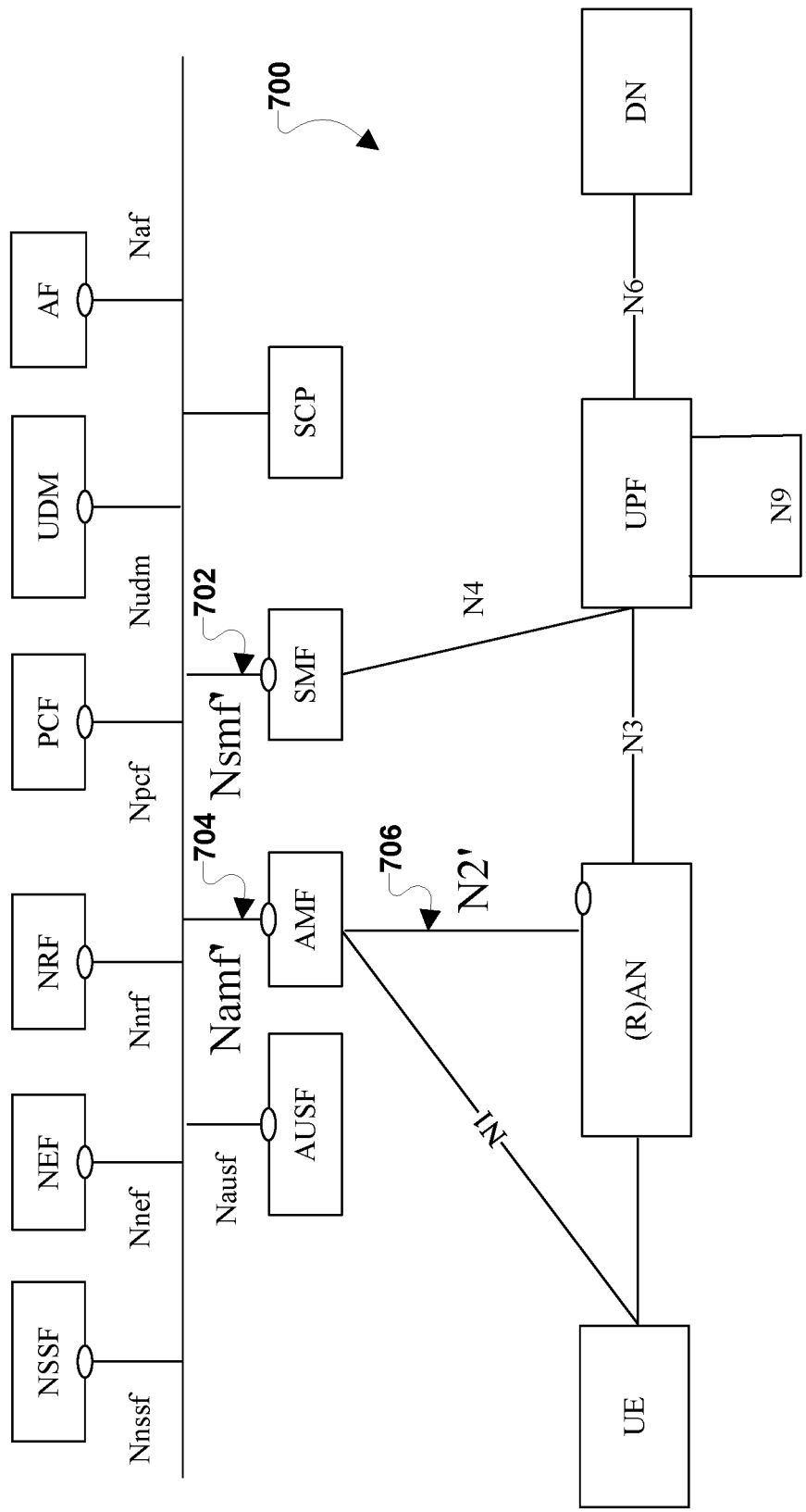
FIG. 7A is an SBI representation of an embodiment procedure for supporting streaming service assistance in a 5GS network.

FIG. 7A is an SBI representation 700 of an embodiment procedure for supporting streaming service assistance in a 5GS network. With reference to FIGS. 1-7A, SBI representation 700 illustrates that another NF function, such as the AMF, may act as a proxy for the (R)AN signalling of instantaneous capacity availability. For example, the service N2 706, the service Namf 704, and/or the service Nsmf 702 such that the AMF or another NF function may act as a proxy for providing RAN capacity notifications to the AF network computing device. For example, the N2InfoNotify service operation may be extended such that the N2RanInformation element is extended with InstCapacityAvailability (ICA) Information Element (IE). In some embodiments, InstCapacityAvailability may include an element "pduSessionId" that may be an identifier of the PDU session for which the ICA is available, an element "qfi" that may be an identifier of the QoS Flow within the PDU Session named by "pduSessionId", the availability window start and end time during which the additional capacity is available, and the anticipated amount of downlink and/or uplink data that can be carried during the availability window. The AF network computing device or SMF may subscribes to this InstCapacityAvailability notification for a particular UE or PDU session. While FIG. 7A illustrates the AMF and SMF acting as proxies, any other NF function, such as the PCF, etc., may act as a proxy in a similar manner in accordance with various embodiments.

Figure 7B:
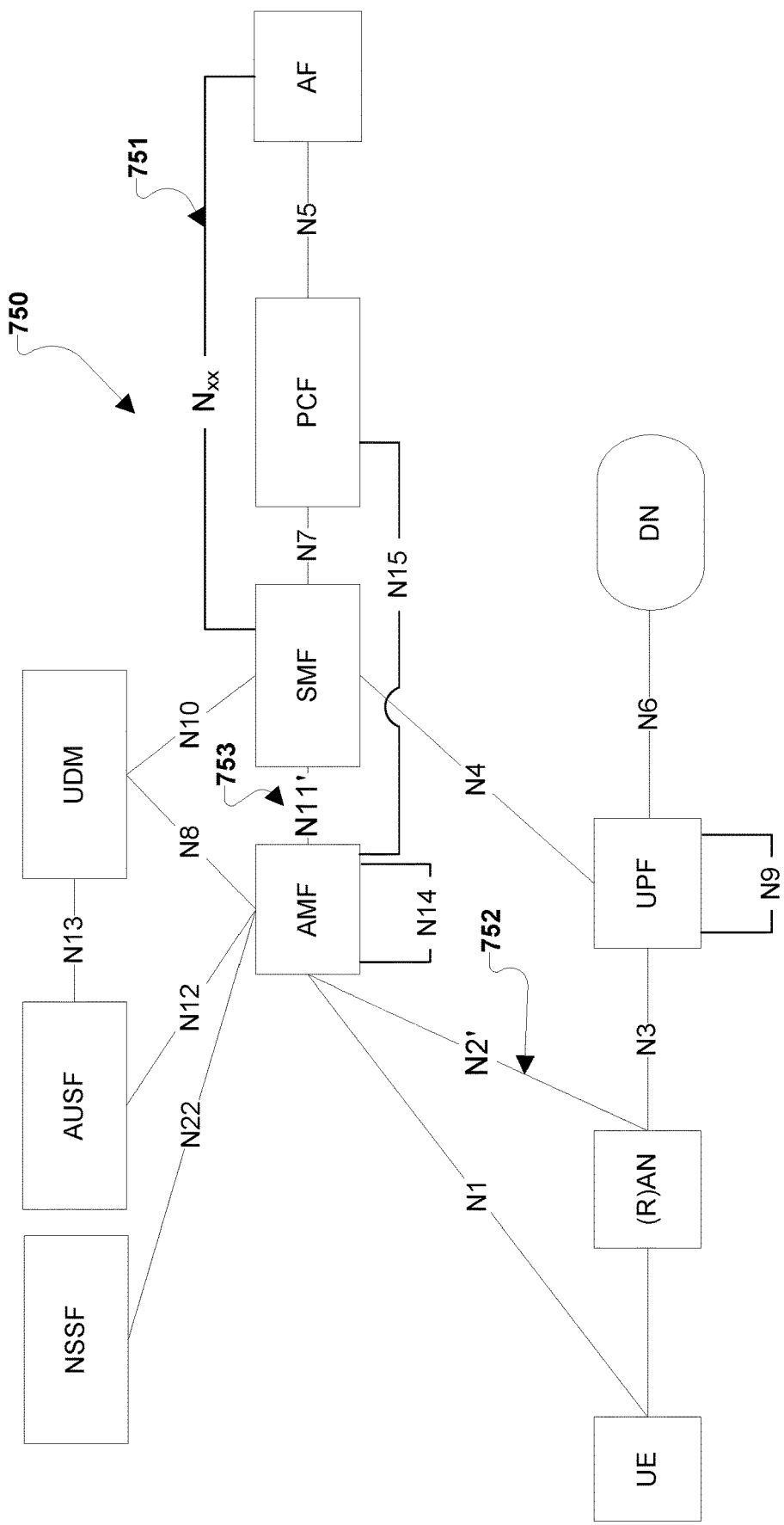
FIG. 7B is a reference point representation of an embodiment procedure for supporting streaming service assistance in a 5GS network.

FIG. 7B is a reference point representation 750 of an embodiment procedure for supporting streaming service assistance in a 5GS network. With reference to FIGS. 1-7B, reference point representation 750 illustrates that another NF function, such as the AMF, may act as a proxy for the (R)AN signalling of instantaneous capacity availability. For example, the reference point N2 752, the reference point N11 753, and a reference point Nx 751 may be configured such that the AMF or another NF function may act as a proxy for providing RAN capacity notifications to the AF network computing device. For example, the NGAP protocol may be used to carry the InstCapacityAvailability notification. The AMF may send the ICA request to the NG-RAN to ask for reporting of instantaneous capacity availability. The NG-RAN may use the ICA REPORT message to inform the AMF about availability. In some embodiments, an AF network computing device may receive notifications through the SMF (e.g., via an extension to the Nsmf_EventExposure_Notify service operation), which in turn is received from the AMF (e.g., via an extension to the Namf_EventExposure_Notify service operation). In some embodiments, the RAN may report general capacity scheduling to the AF network computing device in addition to and/or instead of the instantaneous opportunity. While FIG. 7B illustrates the AMF acting as a proxy, any other NF function, such as the PCF, SMF, etc., may act as a proxy in a similar manner in accordance with various embodiments.

Figure 8:
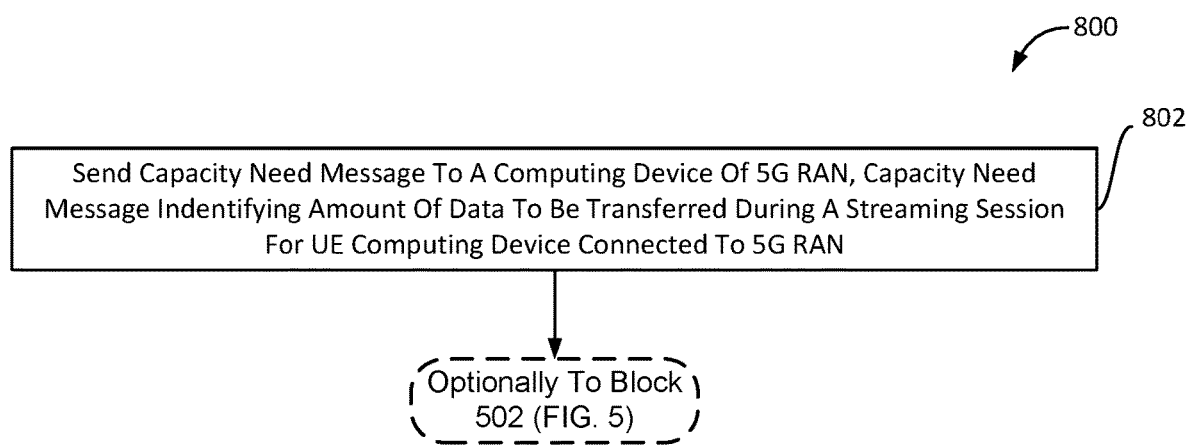
FIG. 8 is a process flow diagram illustrating a method for providing streaming service assistance in a 5GS network in accordance with various embodiments.

FIG. 8 shows a process flow diagram of an example method 800 for providing streaming service assistance in a 5GS network according to various embodiments. With reference to FIGS. 1-8, the method 800 may be implemented by a processor a base station (e.g., the base station 110a-110d, 350) and/or a wireless device (e.g., the wireless device 120a-120e, 200, 320). In various embodiments, the method 800 may be performed in conjunction with the operations of method 500 (FIG. 5).

In block 802, the processor may perform operations including sending a capacity need message to a computing device of a 5G RAN, in which the capacity need message identifies an amount of data to be transferred during a streaming session for a UE computing device communicating with the 5G RAN. In some embodiments, the capacity need message may indicate a desired data rate at which a UE computing device is to transfer streaming service content to the 5G RAN. In some embodiments, a UE computing device and/or the AF network computing device may inform the RAN about needs for capacity for downlink or uplink traffic, such as via a capacity need message identifying an amount of data to be transferred during a streaming session for UE. In some embodiments, the capacity need message may further identify a time window for the applicability of the capacity need message, an identifier of the UE computing device communicating with the 5G RAN, an identifier of a Protocol Data Unit (PDU) session that is the streaming session, an identifier of the QoS Flow within that PDU session, and/or an identifier of the AF network computing device. In some embodiments, the capacity need message may be sent directly from the UE computing device to the computing device of the 5G RAN. For example, the capacity need message may be sent as a RAN signaling message directly from the UE computing device to the computing device of the 5G RAN. In some embodiments, the capacity need message is sent from the UE computing device to the computing device of the 5G RAN via one or more network computing device of the 5GS network. In some embodiments, the RAN capacity notification may be a resource allocation for the streaming session based at least in part on the capacity need message.

As an example, a UE specific message may be defined in the NGAP protocol and the N1N2MessageTransfer procedure may be used by the AF network computing device to send information to the RAN about the UE. The information element that may be the capacity need message may include an indication of a time window for the applicability of the UE's session information, the approximate amount of data that may be transferred for uplink and downlink, an identifier of the UE and PDU session, an identifier of the QoS Flow within that PDU session, and/or an identifier of the Media AF network computing device or the NAssS. A UE computing device and/or the AF network computing device informing the RAN about needs for capacity for downlink or uplink traffic, such as via a capacity need message, may enables a holistic view of the resource allocation to achieve efficient resource allocation by RAN. Every media session to be supported by the RAN may share its short term resource needs for efficient allocation of resources by the RAN. In some embodiments, the AF network computing device, such as the Media AF network computing device, may share this information through a message (e.g., the capacity need message) with the AMF, which may in turn shares it with the relevant RAN. Similarly, the UE may share the information through a message (e.g., the capacity need message) sent directly to the RAN In some embodiments, upon performing the operations of block 802 to send a capacity need message, the processor may perform operations of block 502 of method 500 (FIG. 5). In some embodiments, the capacity need message may be used by the RAN to generate the RAN capacity notification.

Figure 9:
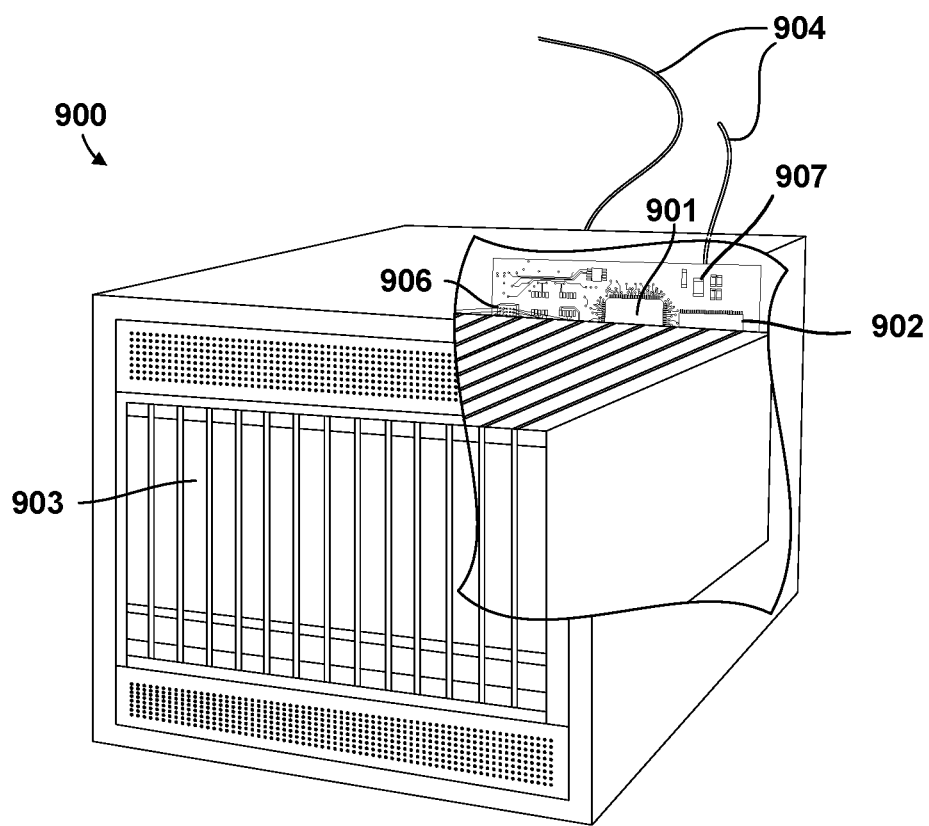
FIG. 9 is a component block diagram of a wireless router device suitable performed by a processor of an application function computing device for providing streaming service assistance in a 5GS network in accordance with various embodiments.

Various embodiments may be implemented on a variety of wireless network devices, an example of which is illustrated in FIG. 9 in the form of a wireless network computing device 900 functioning as a network element of a communication network, such as a base station (e.g., base station 110a-110d, 350, etc.). Such network computing devices may include at least the components illustrated in FIG. 9. With reference to FIGS. 1-9, the network computing device 900 may typically include a processor 901 coupled to volatile memory 902 and a large capacity nonvolatile memory, such as a disk drive 903. The network computing device 900 may also include a peripheral memory access device, such as a floppy disc drive, compact disc (CD) or digital video disc (DVD) drive 906 coupled to the processor 901. The network computing device 900 may also include network access ports 904 (or interfaces) coupled to the processor 901 for establishing data connections with a network, such as the Internet and/or a local area network coupled to other system computers and servers. The network computing device 900 may include one or more antennas 907 for sending and receiving electromagnetic radiation that may be connected to a wireless communication link. The network computing device 900 may include additional access ports, such as USB, Firewire, Thunderbolt, and the like for coupling to peripherals, external memory, or other devices.

Figure 10:
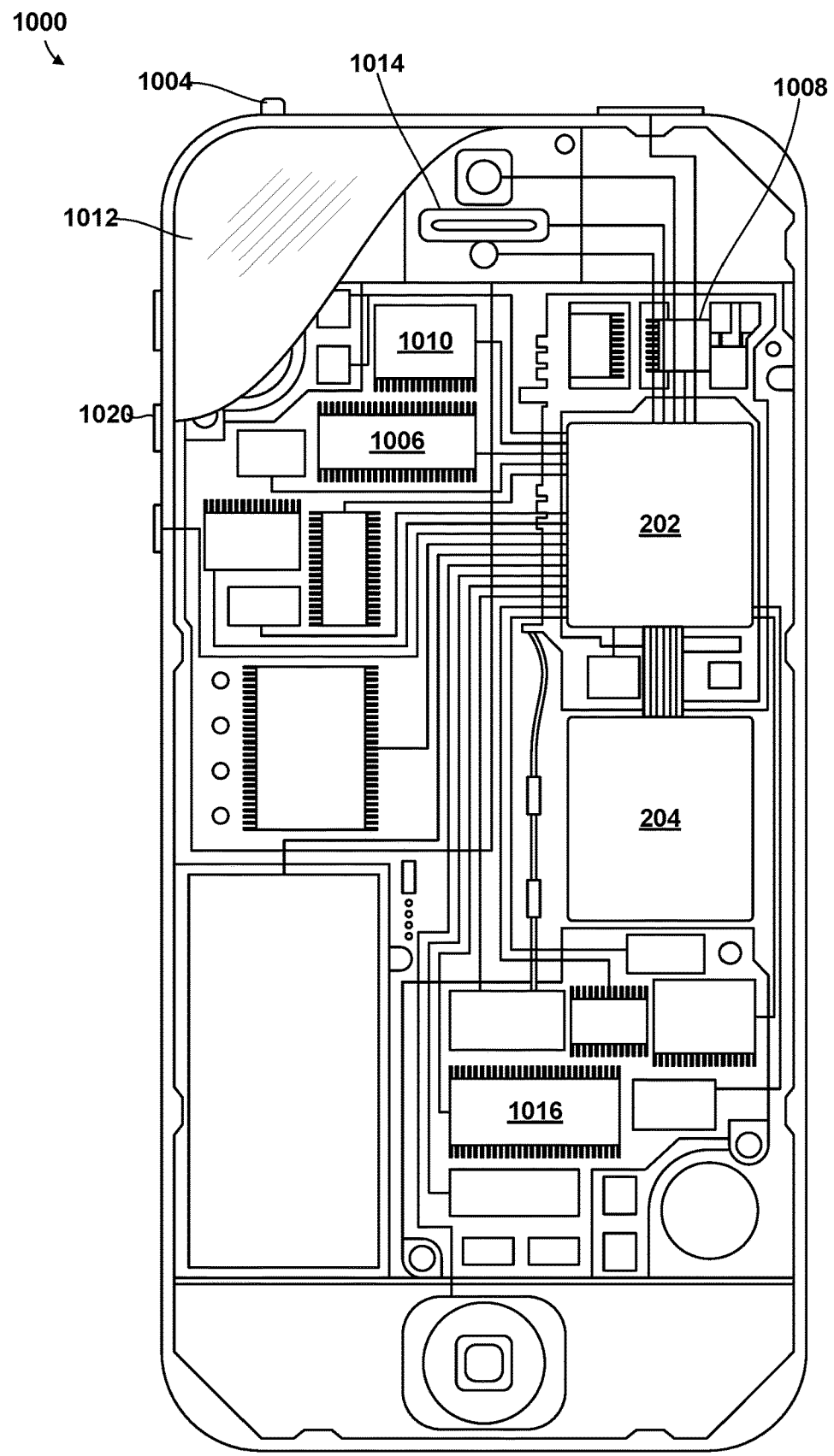
FIG. 10 is a component block diagram of a wireless communication device suitable performed by a processor of an application function computing device for providing streaming service assistance in a 5GS network in accordance with various embodiments.

Various embodiments may be implemented on a variety of wireless devices (e.g., the wireless device 120a-120e, 200, 320), an example of which is illustrated in FIG. 10 in the form of a smartphone 1000. With reference to FIGS. 1-10, the smartphone 1000 may include a first SOC 202 (e.g., a SOC-CPU) coupled to a second SOC 204 (e.g., a 5G capable SOC). The first and second SOCs 202, 204 may be coupled to internal memory 1006, 1016, a display 1012, and to a speaker 1014. Additionally, the smartphone 1000 may include an antenna 1004 for sending and receiving electromagnetic radiation that may be connected to a wireless data link and/or cellular telephone transceiver 1008 coupled to one or more processors in the first and/or second SOCs 202, 204. Smartphones 1000 typically also include menu selection buttons or rocker switches 1020 for receiving user inputs.

A typical smartphone 1000 also includes a sound encoding/decoding (CODEC) circuit 1010, which digitizes sound received from a microphone into data packets suitable for wireless transmission and decodes received sound data packets to generate analog signals that are provided to the speaker to generate sound. Also, one or more of the processors in the first and second SOCs 202, 204, wireless transceiver 1008 and CODEC circuit 1010 may include a digital signal processor (DSP) circuit (not shown separately).

The processors of the wireless network computing device 900 and the smart phone 1000 may be any programmable microprocessor, microcomputer or multiple processor chip or chips that can be configured by software instructions (applications) to perform a variety of functions, including the functions of the various embodiments described below. In some mobile devices, multiple processors may be provided, such as one processor within an SOC 204 dedicated to wireless communication functions and one processor within an SOC 202 dedicated to running other applications. Typically, software applications may be stored in the memory 1006, 1016 before they are accessed and loaded into the processor. The processors may include internal memory sufficient to store the application software instructions As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a wireless device and the wireless device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 500 or 800 may be substituted for or combined with one or more operations of the methods 500 or 800.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method for providing streaming service assistance in a wireless network, comprising:
sending, by a processor of an application function (AF) network computing device, a capacity request to a second network computing device in response to receiving a network assistance request for a streaming application of a user equipment (UE) computing device, wherein the capacity request identifies a flow associated with the UE computing device;
receiving, by the processor of the AF network computing device, a capacity notification that indicates an additional data capacity for the flow associated with the UE computing device in response to the capacity request;
generating, by the processor of the AF network computing device, a network assistance message that indicates the additional data capacity for the flow associated with the UE based at least in part on the capacity notification, wherein the network assistance message is responsive to the capacity request; and
sending, by the processor of the AF network computing device, the network assistance message to the streaming service application.

2. The method of claim 1, wherein the second network computing device is a part of both a fifth generation (5G) system (5GS) network and a 5G radio access network (RAN).

3. The method of claim 2, wherein:
the capacity request is sent via a direct interface between the processor of the AF network computing device and the second network computing device; and
the capacity notification is received via the direct interface.

4. The method of claim 3, wherein the capacity request is a subscription request to receive capacity notifications for a Protocol Data Unit (PDU) session or a Quality of Service (QoS) flow associated with the UE computing device.

5. The method of claim 1, wherein the second network computing device is part of a fifth generation (5G) system (5GS) network that is not part of a 5G radio access network (RAN).

6. The method of claim 5, wherein the capacity notification is received from the second network computing device.

7. The method of claim 1, wherein the second network computing device is one or more of an Access and Mobility Management function (AMF) computing device that is not part of a fifth generation (5G) radio access network (RAN), a Policy Control Function (PCF) computing device that is not part of a fifth generation (5G) radio access network (RAN), or a Session Management function (SMF) computing device that is not part of a fifth generation (5G) radio access network (RAN).

8. The method of claim 1, wherein the streaming service application is an uplink streaming service application or a downlink streaming service application.

9. The method of claim 1, wherein the second network computing device is one or more of a fifth generation (5G) new radio base station (gNodeB), an Access and Mobility Management function (AMF) computing device, a Policy Control Function (PCF) computing device, or a Session Management function (SMF) computing device.

10. The method of claim 1, wherein the network assistance request is a downlink (DL) network assistance (DNA) request or an uplink (UL) network assistance (UNA) request.

11. The method of claim 1, wherein the network assistance request comprises a request for a recommendation of an operational bitrate prior to an initiation of a streaming session.

12. The method of claim 1, wherein the network assistance request comprises a request for a higher bitrate for a streaming session.

13. The method of claim 1, wherein the network assistance message indicates a recommended bitrate for a streaming session based at least in part on the capacity notification.

14. The method of claim 1, wherein the capacity request is a radio access network (RAN) capacity request.

15. The method of claim 14, wherein the second network computing device is an intermediate network function (NF) computing device.

16. The method of claim 15, wherein the NF computing device is a Session Management function (SMF) computing device.

17. An application function (AF) network computing device, comprising:
a processor configured with processor-executable instructions to:
send a capacity request to a second network computing device in response to receipt of the network assistance request for a streaming application of a user equipment (UE) computing device, wherein the capacity request identifies a flow associated with the UE computing device;
receive a capacity notification from that indicates an additional data capacity for the flow associated with the UE computing device in response to the capacity request;
generate a network assistance message that indicates the additional data capacity for the flow associated with the UE based at least in part on the capacity notification, wherein the network assistance message is responsive to the capacity request; and
send the network assistance message to the streaming service application.

18. The AF network computing device of claim 17, wherein the second network computing device is part of both a fifth generation (5G) system (5GS) network and a 5G radio access network (RAN).

19. The AF network computing device of claim 15, wherein the processor is further configured with processor-executable instructions such that the capacity request is a subscription request to receive capacity notifications for a Protocol Data Unit (PDU) session or a Quality of Service (QoS) flow associated with the UE computing device.

20. The AF network computing device of claim 14, wherein the second network computing device is part of a fifth generation (5G) system (5GS) network that is not part of a 5G radio access network (RAN).

21. The AF network computing device of claim 17, wherein the streaming service application is an uplink streaming service application or a downlink streaming service application.

22. The AF network computing device of claim 17, wherein the network assistance request is a downlink (DL) network assistance (DNA) request or an uplink (UL) network assistance (UNA) request.

23. The AF network computing device of claim 17, wherein the network assistance message indicates a recommended bitrate for a streaming session based at least in part on the capacity notification.

24. The AF network computing device of claim 17, wherein the capacity request is a radio access network (RAN) capacity request.

25. The AF network computing device of claim 24, wherein the second network computing device is an intermediate network function (NF) computing device.

26. The AF network computing device of claim 25, wherein the NF computing device is a Session Management function (SMF) computing device.

27. A non-transitory processor readable medium having stored thereon processor-executable instructions configured to cause a processor of an application function (AF) network computing device to perform operations comprising:
    sending a capacity request to a second network computing device in response to receiving the network assistance request, wherein the capacity request identifies a flow associated with the UE computing device;
    receiving a capacity notification that indicates an additional data capacity for the flow associated with the UE computing device in response to the capacity request;
    generating a network assistance message that indicates the additional data capacity for the flow associated with the UE based at least in part on the capacity notification, wherein the network assistance message is responsive to the capacity request; and
    sending the network assistance message to the streaming service application.

28. The non-transitory processor readable medium of claim 27, wherein the stored processor-executable instructions are configured to cause a processor of an AF network computing device to perform operations such that:
    the second network computing device is a part of both a fifth generation (5G) system (5GS) network and a 5G radio access network (RAN); and
    the capacity notification is received via a direct interface between the AF network computing device and the second network computing device.

29. The non-transitory processor readable medium of claim 28, wherein the stored processor-executable instructions are configured to cause a processor of an AF network computing device to perform operations such that the capacity request is a subscription request to receive capacity notifications for a Protocol Data Unit (PDU) session or a Quality of Service (QoS) flow associated with the UE computing device.

30. The non-transitory processor readable medium of claim 27, wherein the second network computing device is part of a fifth generation (5G) system (5GS) network that is not part of a 5G radio access network (RAN).

31. The non-transitory processor readable medium of claim 27, wherein the streaming service application is an uplink streaming service application or a downlink streaming service application.

32. The non-transitory processor readable medium of claim 27, wherein the network assistance request is a downlink (DL) network assistance (DNA) request or an uplink (UL) network assistance (UNA) request.

33. The non-transitory processor readable medium of claim 27, wherein the network assistance message indicates a recommended bitrate for a streaming session based at least in part on the capacity notification.

34. The non-transitory processor readable medium of claim 27, wherein the capacity request is a radio access network (RAN) capacity request.

35. The non-transitory processor readable medium of claim 34, wherein the second network computing device is an intermediate network function (NF) computing device.

36. The non-transitory processor readable medium of claim 35, wherein the NF computing device is a Session Management function (SMF) computing device.

37. An application function (AF) network computing device, comprising:
    means for sending a capacity request to a second network computing device in response to receiving a network assistance request for a streaming application of a user equipment (UE) computing device, wherein the capacity request identifies a flow associated with the UE computing device;
    means for receiving a capacity notification that indicates an additional data capacity for the flow associated with the UE in response to sending the capacity request;
    means for generating a network assistance message that indicates the additional data capacity for the flow associated with the UE based at least in part on the capacity notification, wherein the network assistance message is responsive to the capacity request; and
    means for sending the network assistance message to the streaming service application.

* * * * *